(12) United States Patent
Ishii et al.

(10) Patent No.: US 7,446,923 B2
(45) Date of Patent: Nov. 4, 2008

(54) SEMICONDUCTOR, FUNCTIONAL DEVICE, ELECTROCHROMIC DEVICE, OPTICAL DEVICE, AND IMAGE-TAKING UNIT

(75) Inventors: Yoshio Ishii, Kanagawa (JP); Ryuji Shinohara, Kanagawa (JP); Takuya Inoue, Kanagawa (JP); Takanori Hioki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 435 days.

(21) Appl. No.: 11/366,549

(22) Filed: Mar. 3, 2006

(65) Prior Publication Data
US 2006/0203535 A1 Sep. 14, 2006

(30) Foreign Application Priority Data
Mar. 3, 2005 (JP) ............ P.2005-059004

(51) Int. Cl.
  *G02F 1/15* (2006.01)
  *H01L 23/58* (2006.01)
(52) U.S. Cl. .............. 359/265; 257/103; 257/642; 136/263; 136/244; 148/33.3; 313/495; 438/82
(58) Field of Classification Search ............... 359/248, 359/265, 267, 269, 274, 296; 257/103, 642; 136/244, 246, 249, 255, 256, 263, 265; 438/82, 438/85, 352, 778, 780; 428/1.31, 402, 432, 428/398, 701, 702; 148/33.3, 33.5; 313/495; 365/151
See application file for complete search history.

(56) References Cited

U.S. PATENT DOCUMENTS

| 6,067,184 A * | 5/2000 | Bonhote et al. ............. 359/265 |
| 6,103,942 A * | 8/2000 | Tsuo et al. .................. 568/888 |
| 6,426,827 B1 * | 7/2002 | Bonhote et al. ............. 359/265 |
| 6,479,745 B2 * | 11/2002 | Yamanaka et al. .......... 136/263 |
| 6,734,305 B2 * | 5/2004 | Pierre et al. ................ 544/347 |
| 7,307,379 B2 * | 12/2007 | Iwamatsu et al. ........... 313/495 |
| 2002/0040728 A1 | 4/2002 | Yoshikawa |
| 2003/0127129 A1 | 7/2003 | Yoshikawa et al. |
| 2005/0263182 A1 | 12/2005 | Morooka et al. |

FOREIGN PATENT DOCUMENTS

| EP | 1 494 308 A1 | 1/2005 |
| JP | 2004-47229 A | 2/2004 |
| JP | 2004-171821 A | 6/2004 |
| JP | 2004-273272 A | 9/2004 |
| WO | WO 03/085680 A1 | 10/2003 |

OTHER PUBLICATIONS

XP-000879551, D. S. Ginger et al., "Photoinduced electron transfer from conjugated polymers to CdSe nanocrystals" (1999), Physical Review B, vol. 59, No. 16, pp. 622-629.

(Continued)

*Primary Examiner*—Loha Ben
(74) *Attorney, Agent, or Firm*—Sughrue Mion, PLLC

(57) ABSTRACT

A semiconductor comprises a compound (A) adsorbed on a surface of the semiconductor, the compound (A) having at least one lone electron pair and substantially not undergoing in oxidation-reduction reactions, wherein the presence of the compound (A) negatively changes a flat band potential of the semiconductor with reference to that when the compound is absent.

17 Claims, 4 Drawing Sheets

OTHER PUBLICATIONS

XP-002178698, Christophe J. Barbe et al., "Nanocrystalline Titanium Oxide Electrodes for Photovoltaic Applications" (1997), J. Am. Ceram. Soc., vol. 80, No. 12, pp. 3157-3171.

XP-001012231, Brian A. Gregg et al., "Interfacial Recommendation Processes in Dye-Sensitized Solar Cells and Methods To Passivate the Interfaces" (2001), J. Phys. Chem. B., vol. 105, No. 7, pp. 1422-1429.

XP-002060964, N. C. Greenham et al., "Charge separation and transport in conjugated-polymer/semiconductor-nanocrystal composites studied by photoluminescence quenching and photoconductivity" (1996), Physical Review B., vol. 54, No. 24, pp. 628-637.

XP-001169968, Grr A. Kumara et al., "Efficient dye-sensitized photoelectrochemical cells made from nanocrystalline tin(IV) oxide-zinc oxide composite films" (2003), Semicond. Sci. Technol., vol. 18, No. 4, pp. 312-318.

XP-002377875, Jenny Nelson; "Organic photovoltaic films" (2002), Elsevier Science Ltd., vol. 6, No. 1, pp. 87-95.

XP-002377876, Henrik Lindstrom et al., "Electron Transport Properties in Dye-Sensitized Nanoporous-Nanocrystalline $TiO_2$ Films" (1996), J. Phys. Chem., vol. 100, No. 8, pp. 3084-3088.

Partial European Search Report dated May 9, 2006.

Clemens Bechinger et al., "Photoelectrochromic windows and displays" (1996) Nature Publishing Group, vol. 383, No. 6601, pp. 608-610.

Michael Grutzel, "Perspectives for Dye-sensitized Nanocrystalline Solar Cells" (2000) Progress in Photovoltaics: Research and Applications, vol. 8, No. 1, pp. 171-185.

European Search Report dated Jul. 12, 2006.

\* cited by examiner

SEMICONDUCTOR, FUNCTIONAL DEVICE, ELECTROCHROMIC DEVICE, OPTICAL DEVICE, AND IMAGE-TAKING UNIT

BACKGROUND OF THE INVENTION

1. Field of the Invention

The present invention relates to a semiconductor, and a functional device including the semiconductor (e.g., a cell, a capacitor, a sensor, a photoelectric transducer, a photoelectrochemical cell, a recording device, an electrochromic device, etc.). More specifically, the present invention relates to a semiconductor having a specific compound adsorbed on a surface thereof to control a flat band potential ($V_{fb}$), and a functional device including the semiconductor.

Particularly, concerning the electrochromic device, the present invention relates to an optical device which includes an electromotive force-generating element for generating electromotive force corresponding to the intensity of an electromagnetic wave and an electrochromic device, and an image-taking unit including the optical device.

2. Description of the Related Art

In many cases, the performance of functional devices, such as batteries, capacitors, sensors, photoelectric transducers, photoelectrochemical cells, recording devices, electrochromic devices, and the like, depends on a reaction with a functional material which takes place on a semiconductor surface. The specification of U.S. Pat. No. 4,927,721 and JP-A No. 1-220380 describe typical examples of dye sensitizing photoelectric transducers, and the specifications of U.S. Pat. Nos. 6,067,184, 6,426,827, 6,605,239 and 673,405 and JP-A No. 2003-511837 describe typical examples of electrochromic devices. For a reaction on a semiconductor surface, the flat band potential of the semiconductor material is important. A reason for this is that, when the semiconductor material and the functional material donate/accept electrons at a semiconductor interface, the electrons pass through a valence band edge (i.e., a flat band potential) of the semiconductor material.

It is known that the flat band potential of a semiconductor material is inherent in the semiconductor material, and may vary depending on pH (see, for example, Hiroshi Tubomura, Photoelectrochemistry and Energy Conversion, published by Tokyo Kagaku Dojin, and S. Roy Morrison, Electrochemistry at Semiconductor and Oxidized Metal Electrodes, published by Plenum Press). However, the flat band potential is not necessarily sufficiently controlled.

Although the flat band potential can be controlled through selection of semiconductor materials, any expensive and/or dangerous semiconductor materials cannot be used even if the flat band potential thereof is suitable and expected to enhance the performance of the functional device. On the contrary, even when the semiconductor material is safe and stable and can be produced at relatively low cost, the effect that is to be achieved by the functional device is low unless the flat band potential is at a suitable level. There has been a demand for a method of controlling the flat band potential of a semiconductor material independently from the semiconductor material.

Although pH-based control is available, an organic solvent is often used for the functional device due to functional limitations, and therefore, control methods other than the pH-based control have been desired.

Regarding the dye sensitizing photoelectric transducers, it has been reported that using an electrolyte containing a pyridine compound reduces a reverse current, increasing an open circuit voltage, as disclosed in JP-A No. 2004-47229, JP-A No. 2004-171821 and JP-A No. 2004-273272. However, the reverse current is not necessarily sufficiently prevented, and therefore, there is a demand for means of preventing the reverse current to a further extent. As is apparent from the example of the dye sensitizing photoelectric transducers, there is a demand for general-purpose means of controlling the semiconductor flat band potential, which can be applied to general functional materials including a semiconductor, and a device in which a semiconductor flat band potential is controlled.

SUMMARY OF THE INVENTION

Objects of the present invention are to provide: means of controlling a flat band potential of a semiconductor material using the same semiconductor material without changing the semiconductor material; and flat band potential control means which can be used with an organic solvent. Other objects are to provide: a functional device, particularly an electrochromic device, which is composed of the control means; an optical device using the electrochromic device; and an image-taking unit including the optical device.

In consideration of the above objects, the present inventors diligently conducted studies and arrived at the present invention by finding that a flat band potential is considerably changed by causing a specific compound to be adsorbed onto a semiconductor surface. Preferably, the above objects are achieved by the following means.

(1) A semiconductor comprising a compound (A) adsorbed on a surface of the semiconductor, the compound (A) having at least one lone electron pair and substantially not undergoing oxidation-reduction reactions, wherein the presence of the compound (A) negatively changes a flat band potential of the semiconductor with reference to that when the compound is absent.

(2) The semiconductor of (1), wherein the compound (A) has at least one portion which can be adsorbed onto the surface of the semiconductor.

(3) The semiconductor of any one of (1) and (2), wherein the compound (A) is a heterocyclic compound.

(4) The semiconductor of any one of (1) to (3), wherein an atom having the lone electron pair is an N atom or an O atom.

(5) The semiconductor of any one of (1) to (4), wherein the compound (A) is a five- or six-membered ring compound including an N atom or an O atom.

(6) The semiconductor of any one of (1) to (5), wherein an atom having the lone electron pair has an electric charge of −0.40 or less.

(7) The semiconductor of any one of (1) to (6), wherein an atom having the lone electron pair has an energy level of −11 eV or more.

(8) The semiconductor of any one of (1) to (7), wherein the semiconductor is a nanoporous material.

(9) A functional device comprising the semiconductor of any one of (1) to (8).

(10) A photoelectric transducer or a photoelectrochemical cell, comprising the semiconductor of any one of (1) to (9).

(11) An electrochromic device comprising the semiconductor of any one of (1) to (10).

(12) The electrochromic device of (11), having an optical density of 0.2 or less at a wavelength of 400 nm in a decolored state.

(13) The electrochromic device of any one of (11) and (12), wherein a mean value of an optical density at a wavelength of from 400 to 500 nm, a mean value of an optical density at a wavelength of from 500 to 600 nm, a mean value of an optical density at a wavelength of from 600 to 700 nm in a decolored state, are all 0.1 or less.

(14) An optical device comprising: an electromotive force-generating element for generating electromotive force in response to electromagnetic waves; and the electrochromic device of any one of (11) to (13), driven by the electromotive force.

(15) An image-taking unit comprising the optical device of (14).

(16) The image-taking unit of (15), which is a single-use camera.

Figure 1:
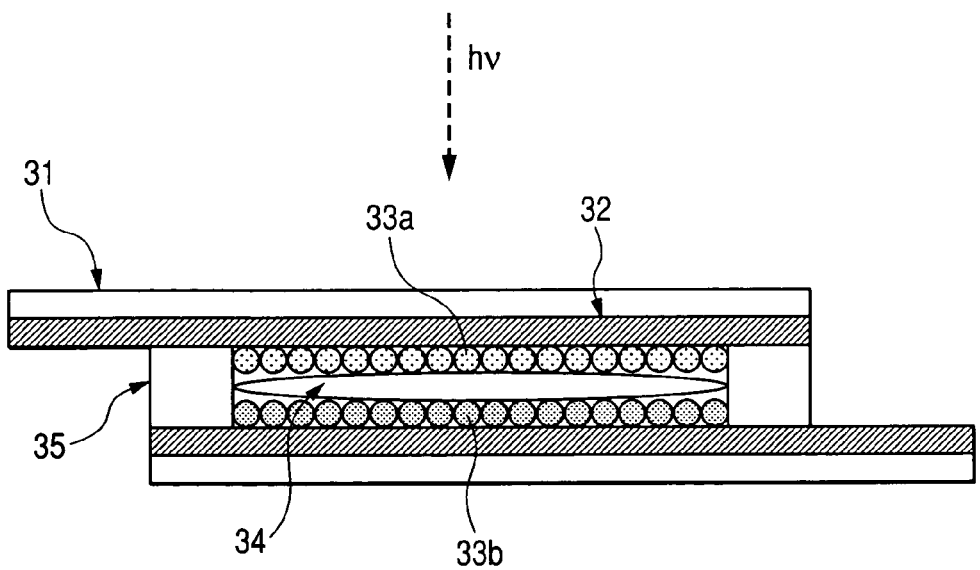
FIG. 1 is a schematic cross-sectional view illustrating a representative exemplary configuration of an electrochromic device according to the present invention.

1 denotes a lens-combined film unit; 4 denotes an image-taking lens; 5 denotes a finder window; 6 denotes a strobe light-emitting part; 8 denotes a shutter switch; 13 denotes a phototransistor; 16 denotes a photographic film; 18 denotes a light cut-off sleeve; 20 denotes a lens holder; 21 denotes an aperture; 22 denotes an exposure opening; 23 denotes a dimmer filter; 24 denotes a stop; 29 denotes an optical axis; 31 denotes a support; 32 denotes an electroconductive coating; 33a, b denote electrochromic material-adsorbed porous materials; 34 denotes an electrolyte; and 35 denotes a spacer.

DETAILED DESCRIPTION OF THE INVENTION

Hereinafter, the present invention will be described in detail.

In the present invention, the definition of "semiconductor" is consistent with its common definition. The "semiconductor", according to "Butsurigaku Jiten (Physics Dictionary)", published by Baifukan Co., Ltd., refers to a substance having an electrical resistance intermediate between those of a metal and an insulator.

As used herein, the term "adsorption of a compound on a semiconductor surface" indicates a phenomenon in which the compound is bonded to the semiconductor surface through chemical bonding (covalent bonding, coordinate bonding, or hydrogen bonding) or physical bonding, and the definition of "adsorption" is consistent with its common definition. The amount of the compound adsorbed on the semiconductor surface can be detected, for example, in a manner as described below.

A semiconductor material deemed as having a compound adsorbed thereon is immersed in 0.1 M NaOH solution, and is shaken for ⁻3 hours at 40° C. The amount of solution to be used at this time is determined, depending on the amount of a semiconductor material, and is suitably 0.5 ml per an applied amount of 1 $g/m^2$. The absorption spectrum of the shaken solution is measured using a spectrophotometer. Note that the type and concentration of the immersion solution used in this case (here, NaOH) and the temperature and time for shaking are determined, depending on the types of the semiconductor material and the compound used, and are not limited to those described above.

As used herein, the term "substantially not undergoing in oxidation-reduction reactions" as in "a compound with one or more lone electron pairs, the compound substantially not undergoing oxidation-reduction reactions" indicates that the "compound with one or more lone electron pairs" does not undergo oxidation-reduction reactions within a range of use.

For example, when the compound is used in a dye sensitizing photoelectric transducer, a voltage is not applied to the device, and therefore, the compound indicates a material which does not undergo in oxidation-reduction reactions within a range in which a voltage is not applied. In this case, a dye (e.g., a ruthenium complex or the like) supported on a semiconductor surface is not included in the "compound with one or more lone electron pairs, the compound substantially not undergoing in oxidation-reduction reactions" as used herein. This is because the "dye supported on a semiconductor surface" is excited by incident light, and the excited dye passes an electron to a semiconductor layer (the dye is oxidized).

Also, when the compound is used in an electrochromic device, the compound indicates a material which does not undergo oxidiation-reduction reactions within the range of a voltage practically applied to the electrochromic device. Electrochromic compounds are oxidized and reduced, and therefore, are not included in the "compound with one or more lone electron pairs, the compound substantially not undergoing oxidation-reduction reactions".

As used herein, when a specific portion is referred to as a "group", it means that the portion itself may not be substituted or may be substituted with one or more (up to a maximum allowable number) substituents. For example, the term "alkyl group" indicates a substituted or unsubstituted alkyl group. Also, any substituent can be used in the compound of the present invention, regardless of the presence or absence of substitution.

Assuming that such a substituent is represented by W, any substituents can be used as W without any particular limitations. Examples thereof include a halogen atom, alkyl groups (including a cycloalkyl group, a bicycloalkyl group, and a tricycloalkyl group), alkenyl groups (including a cycloalkenyl group and a bicycloalkenyl group), an alkynyl group, an aryl group, a heterocyclic group, a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, amino groups (including an alkylamino group, an arylamino group, and a heterocyclic amino group), an ammonio group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group, a phosphono group, a silyl group, a hydrazino group, a ureido group, a boronate group (—B(OH)$_2$), a phosphato group (—OPO(OH)$_2$), a sulfato group (—OSO$_3$H), and other known substituents.

More specifically, W represents a halogen atom (e.g., a fluorine atom, a chlorine atom, a bromine atom, or an iodine atom), an alkyl group [a straight chain, branched, or cyclic, substituted or unsubstituted alkyl group, examples of which include: an alkyl group (preferably an alkyl group having one to thirty carbon atoms, e.g., methyl, ethyl, n-propyl, isopropyl, t-butyl, n-octyl, eicosyl, 2-chloroethyl, 2-cyanoethyl, or 2-ethylhexyl); a cycloalkyl group (preferably a substituted or unsubstituted cycloalkyl group having three to thirty carbon atoms, e.g., cyclohexyl, cyclopentyl, or 4-n-dodecylcyclohexyl); a bicycloalkyl group (preferably a substituted or unsubstituted bicycloalkyl group having five to thirty carbon atoms, i.e., a monovalent group obtained by removing a hydrogen atom from bicycloalkane having five to thirty carbon atoms, e.g., bicyclo[1,2,2]heptane-2-yl or bicyclo-[2,2,2]octane-3-yl); and a tricyclo structure having more ring structures; alkyl groups in substituents described below (e.g., an alkyl group in an alkylthio group) represent alkyl groups conforming with the above notion, and further include alkenyl groups and alkynyl groups], an alkenyl group [a straight chain, branched, or cyclic, substituted or unsubstituted alkenyl group, examples of which include: an alkenyl group (preferably a substituted or unsubstituted alkenyl group having two to thirty carbon atoms, e.g., vinyl, allyl, prenyl, geranyl, or oleyl); a cycloalkenyl group (preferably a substituted or unsubstituted cycloalkenyl group having three to thirty carbon atoms, i.e., a monovalent group obtained by removing a hydrogen atom from cycloalkene having three to thirty carbon atoms, e.g., 2-cyclopentene-1-yl or 2-cyclohexene-1-yl); and a bicycloalkenyl group (a substituted or unsubstituted bicycloalkenyl group, preferably a substituted or unsubstituted bicycloalkenyl group having five to thirty carbon atoms, i.e., a monovalent group obtained by removing a hydrogen atom from bicycloalkene with a double bond, e.g., bicyclo[2,2,1]hept-2-ene-1-yl or bicyclo[2,2,2]oct-2-ene-4-yl)), an alkynyl group (preferably a substituted or unsubstituted alkynyl group having two to thirty carbon atoms, e.g., ethynyl, propargyl or trimethylsilylethynyl) an aryl group (preferably a substituted or unsubstituted aryl group having six to thirty carbon atoms, e.g., phenyl, p-tolyl, naphthyl, m-chlorophenyl, or o-hexadecanoylaminophenyl), a heterocyclic group (preferably a monovalent group obtained by removing a hydrogen atom from a five- or six-membered, substituted or unsubstituted, aromatic or non-aromatic heterocyclic compound, and more preferably a five- or six-membered aromatic heterocyclic group having three to thirty carbon atoms, e.g., 2-furyl, 2-thienyl, 2-pyrimidinyl, or 2-benzothiazolyl; note that a cationic heterocyclic group, such as 1-methyl-2-pyridinio or 1-methyl-2-quinolinio, may be used), a cyano group, a hydroxyl group, a nitro group, a carboxyl group, an alkoxy group (preferably a substituted or unsubstituted alkoxy group having one to thirty carbon atoms, e.g., methoxy, ethoxy, isopropoxy, t-butoxy, n-octyloxy, or 2-methoxyethoxy), an aryloxy group (preferably a substituted or unsubstituted aryloxy group having six to thirty carbon atoms, e.g., phenoxy, 2-methylphenoxy, 4-t-butylphenoxy, 3-nitrophenoxy, or 2-tetradecanoylaminophenoxy), a silyloxy group (preferably a silyloxy group having three to twenty carbon atoms, e.g., trimethylsilyloxy or t-butyldimethylsilyloxy), a heterocyclic oxy group (preferably a substituted or unsubstituted heterocyclic oxy group having two to thirty carbon atoms, e.g., 1-phenyltetrazole-5-oxy or 2-tetrahydropyranyloxy), an acyloxy group (preferably a formyloxy group, a substituted or unsubstituted alkylcarbonyloxy group having two to thirty carbon atoms or a substituted or unsubstituted arylcarbonyloxy group having six to thirty carbon atoms, e.g., formyloxy, acetyloxy, pivaloyloxy, stearoyloxy, benzoyloxy, or p-methoxyphenylcarbonyloxy), a carbamoyloxy group (preferably a substituted or unsubstituted carbamoyloxy group having one to thirty carbon atoms, e.g., N,N-dimethylcarbamoyloxy, N,N-diethylcarbamoyloxy, morpholinocarbonyloxy, N,N-di-n-octylaminocarbonyloxy, or N-n-octylcarbamoyloxy), an alkoxycarbonyloxy group (preferably a substituted or unsubstituted alkoxycarbonyloxy group having two to thirty carbon atoms, e.g., methoxycarbonyloxy, ethoxycarbonyloxy, t-butoxycarbonyloxy, or n-octylcarbonyloxy, an aryloxycarbonyloxy group (preferably a substituted or unsubstituted aryloxycarbonyloxy group having seven to thirty carbon atoms, e.g., phenoxycarbonyloxy, p-methoxyphenoxycarbonyloxy, or p-n-hexadecyloxyphenoxycarbonyloxy), an amino group (preferably an amino group, a substituted or unsubstituted alkylamino group having one to thirty carbon atoms or a substituted or unsubstituted arylamino group having six to thirty carbon atoms, e.g., amino, methylamino, dimethylamino, anilino, N-methyl-anilino, or diphenylamino), an ammonio group (preferably an ammonio group or an ammonio group substituted with a substituted or unsubstituted alkyl, aryl, or heterocyclic group having one to thirty carbon atoms, e.g., trimethylammonio, triethylammonio, or diphenylmethylammonio), an acylamino group (preferably a formylamino group, a substituted or unsubstituted alkylcarbonylamino group having one to thirty carbon atoms or a substituted or unsubstituted arylcarbonylamino group having six to thirty carbon atoms, e.g., formylamino, acetylamino, pivaloylamino, lauroylamino, benzoylamino, or 3,4,5-tri-n-octyloxyphenylcarbonylamino), an aminocarbonylamino group (preferably a substituted or unsubstituted aminocarbonylamino group having one to thirty carbon atoms, e.g., carbamoylamino, N,N-dimethylaminocarbonylamino, N,N-diethylaminocarbonylamino, or morpholinocarbonylamino), an alkoxycarbonylamino group (preferably a substituted or unsubstituted alkoxycarbonylamino group having two to thirty carbon atoms, e.g., methoxycarbonylamino, ethoxycarbonylamino, t-butoxycarbonylamino, n-octadecyloxycarbonylamino, or N-methyl-methoxycarbonylamino), an aryloxycarbonylamino group (preferably a substituted or unsubstituted aryloxycarbonylamino group having seven to thirty carbon atoms, e.g., phenoxycarbonylamino, p-chlorophenoxycarbonylamino, or m-n-octyloxyphenoxycarbonylamino), a sulfamoylamino group (preferably a substituted or unsubstituted sulfamoylamino group having zero to thirty carbon atoms, e.g., sulfamoylamino, N,N-dimethylaminosulfonylamino, or N-n-octylaminosulfonylamino), an alkylsulfonylamino or arylsulfonylamino group (preferably a substituted or unsubstituted alkylsulfonylamino group having one to thirty carbon atoms or a substituted or unsubstituted arylsulfonylamino group having six to thirty carbon atoms, e.g., methylsulfonylamino, butylsulfonylamino, phenylsulfonylamino, 2,3,5-trichlorophenylsulfonylamino, or p-methylphenylsulfonylamino), a mercapto group, an alkylthio group (preferably a substituted or unsubstituted alkylthio group having one to thirty carbon atoms, e.g., methylthio, ethylthio, or n-hexadecylthio), an arylthio group (preferably a substituted or unsubstituted arylthio group having six to thirty carbon atoms, e.g., phenylthio, p-chlorophenylthio, or m-methoxyphenylthio), a heterocyclic thio group (preferably a substituted or unsubstituted heterocyclic thio group having two to thirty carbon atoms, e.g., 2-benzothiazolylthio or 1-phenyltetrazole-5-ylthio), a sulfamoyl group (preferably a substituted or unsubstituted sulfamoyl group having zero to thirty carbon atoms, e.g., N-ethylsulfamoyl, N-(3-dodecyloxypropyl)sulfamoyl, N,N-dimethylsulfamoyl, N-acetylsulfamoyl, N-benzoylsulfamoyl, or N—(N'-phenylcarbamoyl) sulfamoyl), a sulfo group, an alkylsulfinyl or arylsulfinyl group (preferably a substituted or unsubstituted alkylsulfinyl group having one to thirty carbon atoms or a substituted or unsubstituted arylsulfinyl group having six to thirty carbon atoms, e.g., methylsulfinyl, ethylsulfinyl, phenylsulfinyl, or p-methylphenylsulfinyl), an alkylsulfonyl or arylsulfonyl group (preferably a substituted or unsubstituted alkylsulfonyl group having one to thirty carbon atoms or a substituted or unsubstituted arylsulfonyl group having six to thirty carbon atoms, e.g., methylsulfonyl, ethylsulfonyl, phenylsulfonyl, or p-methylphenylsulfonyl), an acyl group (preferably a formyl group, a substituted or unsubstituted alkylcarbonyl group having two to thirty carbon atoms, a substituted or unsubstituted arylcarbonyl group having seven to thirty carbon atoms or a substituted or unsubstituted heterocyclic carbonyl group having four to thirty carbon atoms, which is bonded to a carbonyl group by a carbon atom, e.g., acetyl, pivaloyl, 2-chloroacetyl, stearoyl, benzoyl, p-n-octyloxyphenylcarbonyl, 2-pyridylcarbonyl, or 2-furylcarbonyl), an aryloxycarbonyl group (preferably a substituted or unsubstituted aryloxycarbonyl group having seven to thirty carbon atoms, e.g., phenoxycarbonyl, o-chlorophenoxycarbonyl, m-nitrophenoxycarbonyl, or p-t-butylphenoxycarbonyl), an alkoxycarbonyl group (preferably a substituted or unsubstituted alkoxycarbonyl group having two to thirty carbon atoms, e.g., methoxycarbonyl, ethoxycarbonyl, t-butoxycarbonyl, or n-octadecyloxycarbonyl), a carbamoyl group (preferably a substituted or unsubstituted carbamoyl group having one to thirty carbon atoms, e.g., carbamoyl, N-methylcarbamoyl, N,N-dimethylcarbamoyl, N,N-di-n-octylcarbamoyl, or N-(methylsulfonyl)carbamoyl), an arylazo or heterocyclic azo group (preferably a substituted or unsubstituted arylazo group having six to thirty carbon atoms or a substituted or unsubstituted heterocyclic azo group having three to thirty carbon atoms, e.g., phenylazo, p-chlorophenylazo, or 5-ethylthio-1,3,4-thiadiazole-2-ylazo), an imide group (preferably a N-succinimide or N-phthalimide), a phosphino group (preferably a substituted or unsubstituted phosphino group having two to thirty carbon atoms, e.g., dimethylphosphino, diphenylphosphino, or methylphenoxyphosphino), a phosphinyl group (preferably a substituted or unsubstituted phosphinyl group having two to thirty carbon atoms, e.g., phosphinyl, dioctyloxyphosphinyl, or diethoxyphosphinyl), a phosphinyloxy group (preferably a substituted or unsubstituted phosphinyloxy group having two to thirty carbon atoms, e.g., diphenoxyphosphinyloxy or dioctyloxyphosphinyloxy), a phosphinylamino group (preferably a substituted or unsubstituted phosphinylamino group having two to thirty carbon atoms, e.g., dimethoxyphosphinylamino or dimethylaminophosphinylamino), a phospho group, a silyl group (preferably a substituted or unsubstituted silyl group having three to thirty carbon atoms, e.g., trimethylsilyl, t-butyldimethylsilyl, or phenyldimethylsilyl), a hydrazino group (preferably a substituted or unsubstituted hydrazino group having zero to thirty carbon atoms, e.g., trimethylhydrazino) or a ureide group (preferably a substituted or unsubstituted ureide group having zero to thirty carbon atoms, e.g., N,N-dimethyl ureide).

Also, two Ws may jointly form a ring (an aromatic or non-aromatic hydrocarbon ring, or a heterocyclic ring, which may be further combined to form a polycyclic condensed ring, e.g., a benzene ring, a naphthalene ring, an anthracene ring, a phenanthrene ring, a fluorene ring, a triphenylene ring, a naphthacene ring, a biphenyl ring, a pyrrole ring, a furan ring, a thiophene ring, an imidazole ring, an oxazole ring, a thiazole ring, a pyridine ring, a pyrazine ring, a pyrimidine ring, a pyridazine ring, an indolizine ring, an indole ring, a benzofuran ring, a benzothiophene ring, an isobenzofuran ring, a quinolizine ring, a quinoline ring, a phthalazine ring, a naphthyridine ring, a quinoxaline ring, a quinoxazoline ring, an isoquinoline ring, a carbazole ring, a phenanthridine ring, an acridine ring, a phenanthroline ring, a thianthrene ring, a chromene ring, a xanthene ring, a phenoxathiin ring, a phenothiazine ring, or a phenazine ring).

Among the above substituents W, those having a hydrogen atom may be substituted with a group as described above after the hydrogen atom is removed therefrom. Examples of such substituents include —CONHSO$_2$— groups (a sulfonylcarbamoyl group and a carbonylsulfamoyl group), a —CONHCO— group (a carbonylcarbamoyl group) and a —SO$_2$NHSO$_2$— group (a sulfonylsulfamoyl group).

More specifically, an alkylcarbonylaminosulfonyl group (e.g., acetylaminosulfonyl), an arylcarbonylaminosulfonyl group (e.g., a benzoylaminosulfonyl group), an alkylsulfonylaminocarbonyl group (e.g., methylsulfonylaminocarbonyl), and an arylsulfonylaminocarbonyl group (e.g., p-methylphenylsulfonylaminocarbonyl) are included.

A heterocyclic compound having one or more lone electron pairs used in the present invention is described.

The term "heterocyclic ring" indicates a cyclic compound having at least one hetero atom. The term "hetero atom" indicates a carbon atom, or an atom other than a hydrogen atom. The hetero atom means only an atom which forms a constituent of a ring system of a heterocyclic ring, but not an atom which is located outside of the ring system or separated from the ring system by at least one non-conjugated single bond, or which is a part of another substituent in the ring system. There is no upper limit to the number of hetero atoms, but the number is preferably 10 or less, more preferably 6 or less, and particularly preferably 4 or less.

Any heterocyclic compound which satisfies the above requirements may be used, but the hetero atom is preferably a nitrogen atom, a sulfur atom, an oxygen atom, a selenium atom, a tellurium atom, a phosphorus atom, a silicon atom, or a boron atom, more preferably a nitrogen atom, a sulfur atom, an oxygen atom or a selenium atom, yet more preferably a nitrogen atom, a sulfur atom, or an oxygen atom, particularly preferably a nitrogen atom or an oxygen atom, and most preferably a nitrogen atom.

The heterocyclic ring may have any number of ring members, but the number of ring members is preferably 3 to 8, more preferably 5 to 7, and particularly preferably 5 or 6.

The heterocyclic ring may be saturated or unsaturated, but it has preferably at least one unsaturated portion and more preferably at least two unsaturated portions. In other words, the heterocyclic ring may be aromatic, pseudoaromatic, or non-aromatic, but preferably it is an aromatic or pseudoaromatic heterocyclic ring.

Specifically, examples of the heterocyclic ring include a pyrrole ring, a thiophene ring, a furan ring, an imidazole ring, a pyrazole ring, a thiazole ring, an isothiazole ring, an oxazole ring, an isoxazole ring, a pyridine ring, a pyrazine ring, a pyrimidine ring, a pyridazine ring, an indolizine ring, a triazole ring, an oxadiazole ring, a thiadiazole ring, a tetraazaindene ring, a pentaazaindene ring, a hexaazaindene ring, a purine ring, a tetrazole ring, a pyrazotriazole ring, a pyrrolotriazole ring, benzo-fused rings thereof, including an indole ring, a benzofuran ring, a benzothiophene ring, an isobenzofuran ring, a quinolizine ring, a quinoline ring, a phthalazine ring, a quinoxaline ring, an isoquinoline ring, a carbazole ring, a phenanthridine ring, a phenanthroline ring, an acridine ring, and a benzotriazole ring, and partially or fully saturated rings thereof, including a pyrrolidine ring, a pyrroline ring, an imidazoline ring, and the like.

The "lone electron pair" is also referred to as an "unshared electron pair" or a "lone pair", and indicates an electron pair including two electrons in a single orbital, which is not involved in covalent bonding. Any lone electron pairs which satisfy the requirements may be included, but the lone electron pair is preferably of a hetero atom within a heterocyclic ring, and more preferably it is not incorporated as a part of a π electron system. In other words, the lone electron pair is preferably present on a plane (or in an SP2 orbital) in the heterocyclic ring.

Typical examples of the heterocyclic ring having one or more lone electron pairs are illustrated below.

(aa-1)

(aa-2)

(aa-3)

(aa-4)

(aa-5)

(aa-6)

(aa-7)

(aa-8)

(aa-9)

(aa-10)

(aa-11)

-continued (aa-12)

(aa-13)

(aa-14)

(aa-15)

(aa-16)

(aa-17)

(aa-18)

(aa-19)

(aa-20)

(aa-21)

(aa-22)

(aa-23)

(aa-24)

(aa-25)

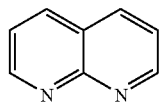
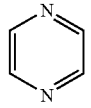
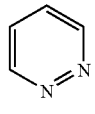
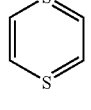
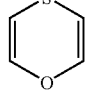
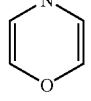
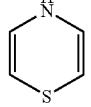
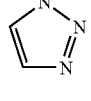
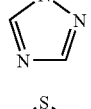
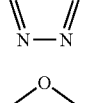
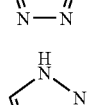
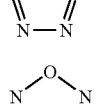
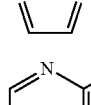
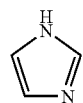
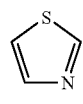
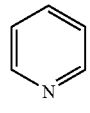
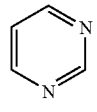
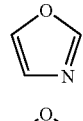
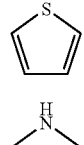
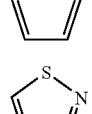
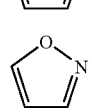
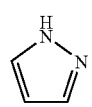

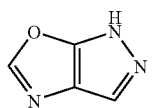 (aa-26)
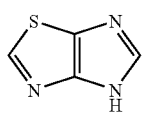 (aa-27)
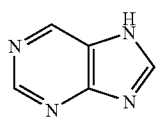 (aa-28)
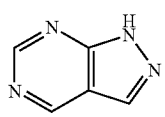 (aa-29)
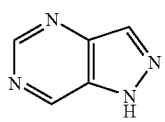 (aa-30)
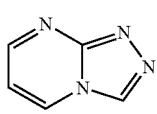 (aa-31)
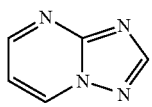 (aa-32)
Examples of a heterocyclic ring with a fused benzene ring include the following.
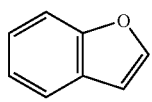 (b-1)
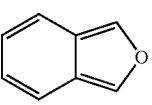 (ab-2)
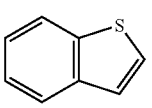 (ab-3)
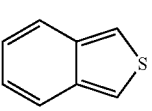 (ab-4)
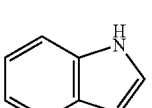 (ab-5)
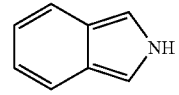 (ab-6)
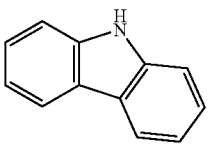 (ab-7)
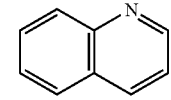 (ab-8)
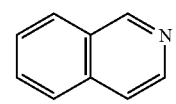 (ab-9)
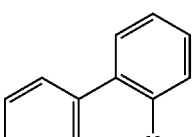 (ab-10)
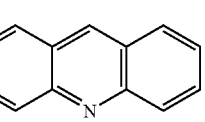 (ab-11)
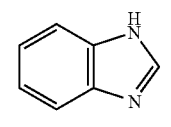 (ab-12)
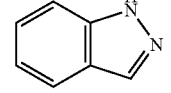 (ab-13)
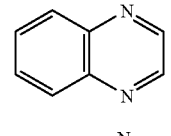 (ab-14)
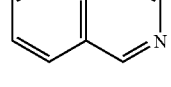 (ab-15)
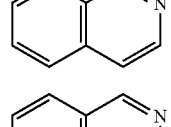 (ab-16)
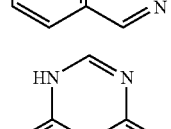 (ab-17)
(ab-18)

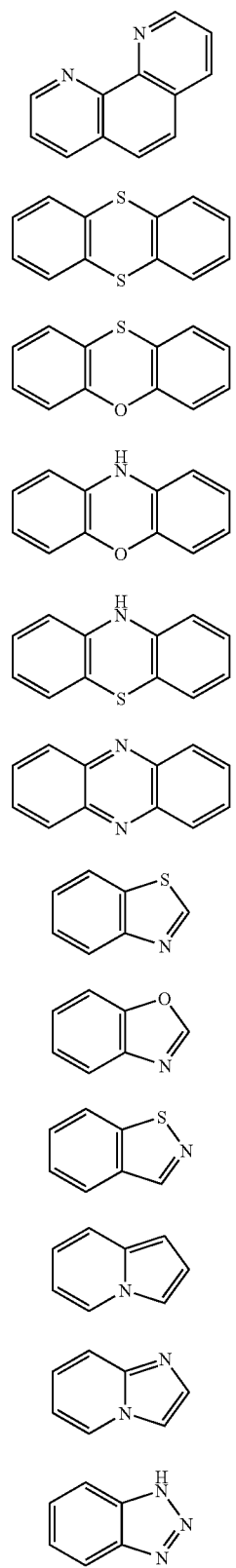
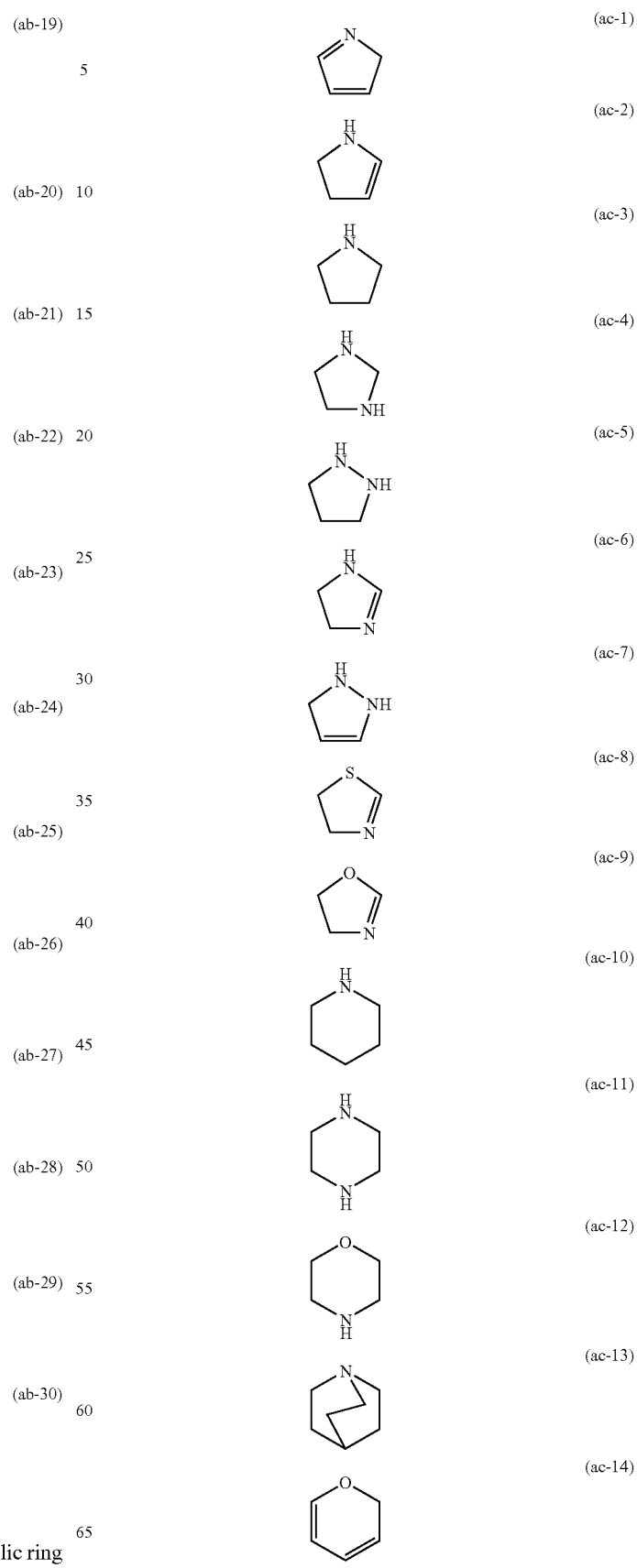
Examples of a partially or fully saturated heterocyclic ring include the following.

-continued (ac-15) 

(ac-16) 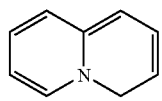

(ac-17) 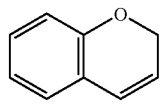

(ac-18) 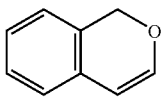

(ac-19) 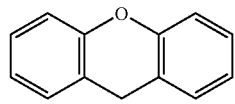

The following are other possible heterocyclic rings.

(ad-1) 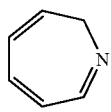

(ad-2) 

(ad-3) 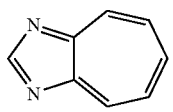

(ad-4) 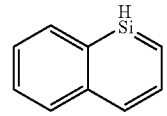

(ad-5) 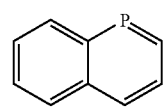

(ad-6) 

(ad-7) 

(ad-8) 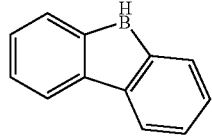

These heterocyclic rings having one or more lone electron pairs may be substituted with any substituent or may be fused, and the above-described W is an example of the substituent. Also, a tertiary nitrogen atom included in the heterocyclic ring may be substituted to become quaternary nitrogen. Note that any other drawable tautomeric structures of the heterocyclic ring are chemically equivalent.

In order to allow adsorption to a semiconductor, the above-described compound substituents of the present invention can be selected. Examples thereof include a hydrophobic group (ballast group), a solubilization group, and an acid group which assists in adsorption to the surface of a semiconductor. Examples of the acid group include a carboxyl group, a sulfo group, a sulfato group, a phosphono group, a phosphoto group, a boronate group, a phenolic hydroxyl group, a sulfonylcarbamoyl group, a carbonylsulfamoyl group, a carbonylcarbamoyl group and a sulfonylsulfamoyl group, preferably a carboxyl group, a phosphono groups, and a phosphoto group, and particularly preferably a phosphono group and a phosphoto group. In the case where a device is produced using a semiconductor having a compound adsorbed thereon, and is brought into contact with a liquid, such as an electrolyte or the like, it is preferable that the solubility of the compound in the liquid be low. In this case, a liquid in which the compound is highly soluble may be used at the step of causing the compound to be adsorbed onto the semiconductor.

Also, any means may be used for the adsorption onto the semiconductor.

Specifically, as the adsorption means, chemical bonding, such as covalent bonding, coordinate bonding, or hydrogen bonding, or electrostatic interaction may be used. Here, coordinate bonding using alone electron pair may be used. Also, the compound may have a hydrophobic ballast group for interaction with a hydrophobic portion of the semiconductor surface.

Preferable means for the adsorption onto the semiconductor in accordance with the present invention are (1) a method of causing a compound which has an adsorption group in addition to a lone electron pair to be adsorbed onto the semiconductor, and (2) a method which uses a lone electron pair for the adsorption onto the semiconductor. The method/compound of (1) is more preferable. This is because (1) is preferable over (2) with respect to adsorption power. Also, in the case of using the method/compound of (1), it is particularly preferable that a portion (group) to be adsorbed and the lone electron pair be positioned on the same side. This is because adsorption of the adsorbed group onto the semiconductor allows the lone electron pair to face the semiconductor surface.

Next, specific examples of particularly preferable heterocyclic compounds having one or more lone electron pairs are illustrated. The present invention is not limited to them.

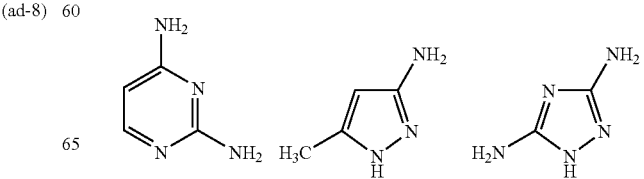

-continued

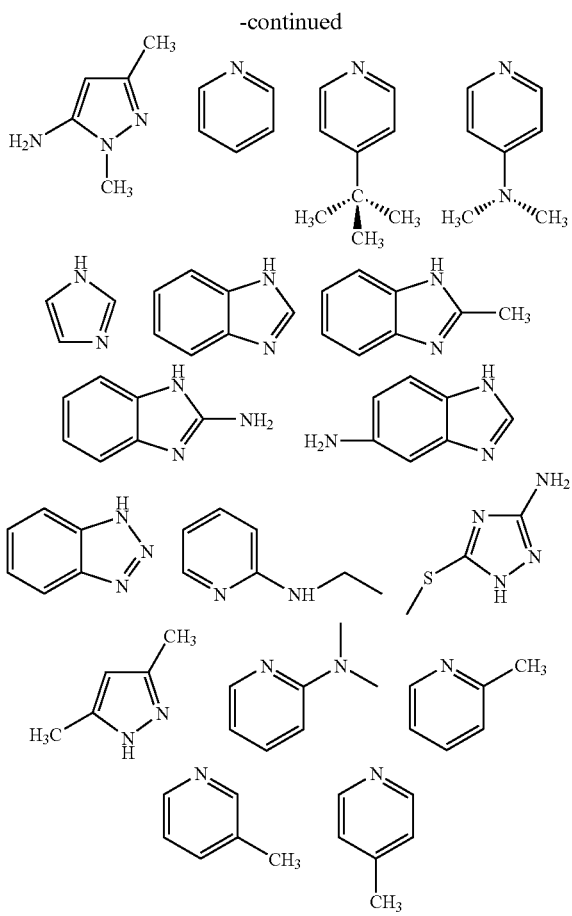

For example, "The Chemistry of Heterocyclic Compounds-A Series of Monographs", Vols. 1 to 59, written by Edward C. Taylor and Arnold Weissberger, published by John Wiley & Sons, and "Heterocyclic Compounds", Vols. 1 to 6, written by Robert C. Elderfield, published by John Wiley & Sons describe compounds that can be used as the heterocyclic compound having one or more lone electron pairs. Also, the heterocyclic compound having one or more lone electron pairs can be synthesized based on methods described therein.

In the present invention, the compound having one or more lone electron pairs preferably has an atom with a lone electron pair, that has thereon an electric charge of −0.40 or less (unit: $1.6 \times 10^{-19}$ C). By "−0.40 or less", it is meant that the electric charge has a negative value of −0.40 or a larger negative value than this. More preferable is −0.5 or less. Also, the energy level of the atom with a lone electron pair is preferably −11 eV or more, more preferably −9.5 eV or more. Regarding the electric charge and energy level in the present invention, an ab initio molecular orbital method was used to obtain an electric charge on the atom with a lone electron pair and a molecular orbital energy level.

In the ab initio molecular orbital calculation, the 6-31G basis set was used in the Hartree-Fock (HF) approximation. The Merz-Kollman-Singh method (J. Comput. Chem., vol. 11 (1990) 431) was used for the electric charge. As a calculation program, Gaussian 03[*] was used.

Note that in the case where molecules were symmetrical, the calculation was performed on the most symmetrical structure.

In the case where there were two or more atoms having a lone electron pair, the smallest (large negative) electric charge on the atoms was used.

As for the molecular orbital energy level, the highest among energy levels of occupied π orbitals having lobes on atoms was used.

[*] Gaussian 03, Revision C. 02, M. J. Frisch, G. W. Trucks, H. B. Schlegel, G. E. Scuseria, M. A. Robb, J. R. Cheeseman, J. A. Montgomery, Jr., T. Vreven, K. N. Kudin, J. C. Burant, J. M. Millam, S. S. Iyengar, J. Tomasi, V. Barone, B. Mennucci, M. Cossi, G. Scalmani, N. Rega, G. A. Petersson, H. Nakatsuji, M. Hada, M. Ehara, K. Toyota, R. Fukuda, J. Hasegawa, M. Ishida, T. Nakajima, Y. Honda, O. Kitao, H. Nakai, M. Klene, X. Li, J. E. Knox, H. P. Hratchian, J. B. Cross, C. Adamo, J. Jaramillo, R. Gomperts, R. E. Stratmann, O. Yazyev, A. J. Austin, R. Cammi, C. Pomelli, J. W. Ochterski, P. Y. Ayala, K. Morokuma, G. A. Voth, P. Salvador, J. J. Dannenberg, V. G. Zakrzewski, S. Dapprich, A. D. Daniels, M. C. Strain, O. Farkas, D. K. Malick, A. D. Rabuck, K. Raghavachari, J. B. Foresman, J. V. Ortiz, Q. Cui, A. G. Baboul, S. Clifford, J. Cioslowski, B. B. Stefanov, G. Liu, A. Liashenko, P. Piskorz, I. Komaromi, R. L. Martin, D. J. Fox, T. Keith, M. A. Al-Laham, C. Y. Peng, A. Nanayakkara, M. Challacombe, P. M. W. Gill, B. Johnson, W. Chen, M. W. Wong, C. Gonzalez, and J. A. Pople, Gaussian, Inc., Wallingford Conn., 2004.

As used herein, the term "flat band potential" indicates a flat band potential measured by the MS (Mott-Schottky) method. For the MS method, see, for example, (1) Akira Fujishima, Masuo Aizawa and Toru Inoue, "Denkikagaku Sokuteiho (Electrochemical Measurement Method)", (Gihodo Shuppan Co., Ltd.), (2) Hiroshi Tsubomura, "Kodenkikagaku To Enerugiihenkan (Photoelectrochemistry and Energy Conversion)", Tokyo Kagaku Dozin Co., Ltd., and (3) S. Roy Morrison, "Electrochemistry at Semiconductor and Oxidized Metal Electrodes", PLENUM PRESS.

As used herein, the term "negatively change" means that an energy potential is shifted in the minus direction. Note that shifting an energy potential in the plus direction is referred to by "positively changing".

As used herein, the term "the presence of a compound negatively changes a flat band potential of the semiconductor with reference to that when the compound is absent" indicates that, in the case where 0.02M of the compound is dissolved into a γ-butyrolactone solution having 0.2M LiClO$_4$ dissolved therein and the flat band potential is measured in accordance with the MS method, the measured potential is negative by at least 0.10 V compared to a blank (a solution in which the compound has not been dissolved, i.e., a γ-butyrolactone solution having 0.2M LiClO$_4$ dissolved therein). Note that the MS measurement is carried out at 25° C., and dissolved oxygen in the solution that is to be used is substituted with argon. The measurement uses a nanoporous SnO$_2$ substrate provided on an ITO or FTO conductive glass, and the measuring frequency is 200 to 2,000 Hz. Also, in the case where 0.02 M of the compound is not dissolved in the γ-butyrolactone solution having 0.2 M LiClO$_4$ dissolved therein, a saturated solution capable of dissolving the compound is used.

Hereinafter, the case where the present invention is applied to a functional device, particularly an electrochromic device, will be described in further detail.

As used herein, the term "functional device" indicates a device which performs some useful function. Examples of the functional device include a cell, a capacitor, a sensor, a photoelectric transducer, a photoelectrochemical cell, a recording device, an electrochromic device, and the like.

As used herein, the term "optical density" indicates a value A calculated by the following mathematical expression (1), where $I_O$ is an intensity of light incident on an electrochromic device (an optical density changing element) and $I_T$ is an intensity of transmitted light.

$$A = -\log(I_T/I_O) \quad \text{Mathematical expression (1)}$$

As used herein, the term "nanoporous material" indicates a material having a surface area which is increased by forming projections and depressions in the order of nanometers so that the surface adsorbs as many substances as possible. The degree of porosity is expressed by a "roughness coefficient". Also, as used herein, the term "roughness coefficient of a nanoporous semiconductor material" indicates a ratio of a practically valid surface area to a projected plane of the surface of a corresponding semiconductor material layer. Specifically, the coefficient can be measured using the BET method. The roughness coefficient is preferably 10 or more, more preferably 30 or more, and particularly preferably 100 or more.

As used herein, the term "decolored state" indicates that an electrochromic device is in the state where the optical density thereof is rendered as low as possible by short-circuiting opposite ends of the electrochromic device or applying reverse voltage between the opposite ends, i.e., applying a voltage in the positive or negative direction opposite to the negative or positive voltage which is to be applied for coloring.

As used herein, the definition of "semiconductor material" is consistent with its common definition.

As used herein, the definition of "semiconductor material doped with an impurity element" is consistent with its common definition. For example, according to "Butsurigaku Jiten (Physics Dictionary)" (Baifukan Co., Ltd.), the "impurity semiconductor" is defined as a semiconductor containing an impurity, such as a donor and an acceptor, in which electrons and positive holes supplied by the impurity control electrical conduction, and in a broad sense, the impurity semiconductor is defined as having a defect or a deep impurity. The present invention encompasses impurity semiconductors in the above-described broad sense.

As used herein, the term "doped" is consistent with the common definition of "doping". For example, according to "Butsurigaku Jiten (Physics Dictionary)" (Baifukan Co., Ltd.), the term "doping" indicates addition of a small amount of impurity to a crystal, and examples of an addition method include an alloying method, a diffusion method, an ion implantation method, and the like.

As used herein, the term "adsorption of an electrochromic material onto a nanoporous semiconductor material" indicates a phenomenon in which the electrochromic material is bonded to the nanoporous semiconductor material surface through chemical bonding (covalent bonding, coordinate bonding or hydrogen bonding) or physical bonding, and the definition of "adsorption" is consistent with its common definition. The amount of the electrochromic material adsorbed on the nanoporous semiconductor material surface can be detected, for example, in a manner as described below.

A nanoporous semiconductor material deemed as having an electrochromic material adsorbed thereon is immersed into 0.1 M NaOH solution, and is shaken for 3 hours at 40° C. The amount of solution to be used at this time is determined in accordance with the amount of the electrochromic material that is to be applied, and is suitably 0.5 ml per an applied amount of 1 g/m². The absorption spectrum of the shaken solution is measured using a spectrophotometer. Note that the type and concentration of immersion solution to be used in this case (here, NaOH) and the temperature and time for shaking are determined, depending on the types of the nanoporous semiconductor material and the electrochromic material, and are not limited to those described above.

As used herein, the term "electromagnetic waves" is consistent with its common definition. For example, according to "Butsurigaku Jiten (Physics Dictionary)" (Baifukan Co., Ltd.), the electric field and the magnetic field are classified into a static field, which is temporally consistent, and a wave field, which temporally varies and propagates far in a space, and the wave field is defined as electromagnetic wave. Specifically, there are classifications, such as γ-ray, X-ray, ultraviolet ray, visible light, infrared light, and radio wave. All of these are encompassed by the electromagnetic waves targeted by the present invention, but particularly in the case of applying an optical device according to the present invention to a dimmer system of a camera unit, the targets are preferably ultraviolet light, visible light, and infrared light, and more preferably visible light.

An electrochromic device which is suitable for use as a dimmer filter and can achieve a spectral sensitivity similar to that of an image-taking film, is one which, in a colored state thereof, has an optical density variation of 0.5 or less (preferably 0.3 or less) among average optical densities of the wavelength ranges from 450 to 470 nm, from 540 to 560 nm, and from 630 to 650 nm (i.e., the difference between the maximum and minimum values of the three average values), and more preferably one which, in the colored state, has average optical densities of 0.5 or more (preferably 0.8 or more, and more preferably 0.95 or more) in the wavelength ranges from 450 to 470 nm, from 540 to 560 nm, and from 630 to 650 nm. FIG. 1 illustrates a schematic cross-sectional view illustrating a representative exemplary configuration of an electrochromic device (optical density changing element) according to the present invention.

As used herein, the term "an electrochromic device in a colored state has an optical density variation of 0.5 or less among average optical densities of the wavelength ranges: (a) from 450 to 470 nm; (b) from 540 to 560 nm; and (c) from 630 to 650 nm" indicates that the difference between the maximum and minimum values of the three optical densities (a), (b) and (c) is 0.5 or less. Also, the optical density variation is preferably 0.5 or less, more preferably 0.3 or less, and most preferably 0.1 or less.

Also, it is preferable that the overlap in spectral sensitivity between the hue of the electrochromic device in a colored state and the hue of an image recording medium (photosensitive material, CCD, CMOS, or the like) included in an image-taking unit be as large as possible.

In the case of applying an electrochromic device according to the present invention to a dimmer device of an image-taking unit (preferably, a camera unit), the device preferably has an absorption property similar to that of neutral gray, which uniformly absorbs incident light, the electrochromic device (optical density changing element) absorbs visible light, preferably visible light having a plurality of different wavelengths, more preferably blue light, green light, and red light, and the average optical density is preferably a value as described above concerning the solving means (13).

As used herein, the term "neutral gray" indicates not only that the optical absorption spectrum of the electrochromic device in a colored state is uniform throughout the wavelength range from 400 to 700 nm (the term "uniform" indicates that the difference between the average optical density in the wavelength range from 400 to 700 nm and the optical density at each wavelength is small, e.g., the difference in optical density is 0.1), but also that the overlap between the hue of the device in a colored state and the hue of a recording medium of an image-taking unit is so large that the colored state becomes substantially "neutral gray" to the image-taking unit.

An optical device according to the present invention includes an electromotive force-generating element for generating electromotive force using at least electromagnetic wave, and an optical density changing element (electrochromic device) for changing the optical density using the electromotive force. The electromotive force-generating element generates electromotive force in response to electromagnetic waves, and the optical density of the electrochromic device is changed, depending on the electromotive force. Accordingly, it is possible to use the optical device according to the present invention as a dimmer device for changing the intensity of transmitted light in accordance with the strength of electromagnetic wave.

The rate of change in the optical density of the electrochromic device relative to the electromotive force generated by the electromotive force-generating element can be properly changed, depending on purposes. For example, in the case of controlling the intensity of light incident on a single-use camera, it is preferable to generate electromotive force such that the rate of change in light intensity and the rate of change in optical density are equalized as much as possible.

Hereinafter, each element of the optical device according to the present invention is described.

As used herein, the term "element for generating electromotive force (electromotive force-generating element)" indicates an element for converting electromagnetic wave energy into electric energy. Specifically, a typical example of the element is a solar cell for converting sunlight into electric energy. Examples of a material for forming a solar cell include compounds, such as monocrystal silicon, polycrystal silicon, amorphous silicon, cadmium telluride, copper indium selenide, and the like. The solar cell is selected from known solar batteries using the above compounds, depending on the purpose of use of the optical device according to the present invention.

Also, technologies concerning photoelectric transducers using an oxide semiconductor sensitized by a dye (hereinafter, referred to as "dye sensitizing photoelectric transducers") and photoelectrochemical cells using such transducers, which are described in, for example, Nature, Vol. 353, pp. 737 to 740 (1991), the specification of U.S. Pat. No. 4,927,721, and JP-A No. 2002-75443, are applicable to the electromotive force-generating element of the present invention. Also, the above dye sensitizing photoelectric transducers are preferable for the electromotive force-generating element of the present invention.

Also, the electromotive force-generating element may be provided by combining an electromagnetic wave sensor with a voltage source. In this case, there are no particular limitations on the electromagnetic wave sensor, and examples of the sensor include a phototransistor, a CdS sensor, a photodiode, a CCD, a CMOS, an NMOS, a solar cell, and the like. The material for the electromagnetic wave sensor can be suitably selected, depending on the wavelength of an electromagnetic wave to which the sensor is desired to respond. The directivity of the electromagnetic wave sensor with respect to an electromagnetic wave is preferably high.

The electromagnetic wave sensor may be the same as that for an image-taking device. For example, in the case of a digital still camera, a CCD, a CMOS or an NMOS which is used as an image-taking device can be simultaneously used as the electromagnetic wave sensor. There are no particular limitations on the voltage source, and an example thereof is a dry cell. As used herein, the "dry cell" may be either a primary cell (e.g., an alkaline dry cell, a manganese dry cell, etc.) or a secondary cell (e.g., a nickel-cadmium cell, a nickel hydrogen cell, a lithium ion cell, etc.).

A preferable electromotive force-generating element of the present invention is a combination of a solar cell which is composed of monocrystal silicon, polycrystal silicon, or amorphous silicon, a dye sensitizing photoelectric transducer, a phototransistor, and a dry cell. In the case of applying an optical device according to the present invention to an image-taking unit (preferably, a camera unit), the electromotive force-generating element preferably generates electromotive force having a strength depending on the intensity of an electromagnetic wave (in particular, sunlight) with which the element is irradiated.

As used herein, the term "element for changing optical density (optical density changing element=electrochromic device)" indicates an element for changing optical density using electromotive force generated by an electromotive force-generating element, i.e., electric energy, thereby changing the transmittance of an electromagnetic wave.

The electrochromic device (optical density changing element) includes a porous material to which a material (electrochromic material) for changing optical density in accordance with electric energy is adsorbed, and further includes a support provided with an electroconductive coating and an electric charge transport material responsible for conductivity in the electrochromic device. FIG. 1 illustrates a representative exemplary configuration of the electrochromic device. In FIG. 1, electrochromic materials are adsorbed to porous materials (33$a$ and 33$b$). The optical densities of the electrochromic materials are changed in response to electric energy supplied from above and below through an electroconductive coating 32 and the porous materials 33. In accordance with changes in the optical densities of the electrochromic materials, an incident electromagnetic wave hv is absorbed into the electrochromic materials to change the intensity of transmitted light. The electrochromic device is not limited to the form of FIG. 1, and can be provided in various forms, depending on purposes, e.g., in the form of an optical filter, a lens, a stop, a mirror, a window, eyeglasses, a display panel, or the like. In the case of an image-taking unit (preferably, a camera unit), the electrochromic device is preferably an optical filter, a lens or a stop.

There are no particular limitations on the support included in the electrochromic device, and examples thereof include glass, plastic, polyethyleneterephthalate (PET), polyethylene naphthalate (PEN), triacetylcellulose (TAC), polycarbonate (PC), polysulfone, polyethersulfone (PES), polyetheretherketone, polyphenylenesulfide, polyarylate (PAR), polyamide, polyimide (PIM), polystyrene, norbornene resin (ARTON), acrylic resin, polymethylmethacrylate (PMMA), and the like, from which a suitable selection is made, depending on the purpose and form of the device. Materials having low absorption of an electromagnetic wave targeted by the optical device according to the present invention are preferably selected. Glass, PET, PEN, TAC, or acrylic resin is particularly preferable for light of $\lambda$=400 nm to 700 nm. Also, in order to avoid loss of transmitted light due to reflection by the support surface, the support surface is preferably provided with an anti-reflection layer (e.g., a thin layer of silicon oxide) In addition, the surface may be provided with various functional layers, such as a shock absorbing layer for preventing shock on the device, an anti-abrasion layer for preventing the device from being damaged by abrasion, and an electromagnetic wave absorbing layer for cutting off non-target electromagnetic waves (e.g., ultraviolet light for a visible light optical device), or the like. For an ultraviolet absorber and a filter layer including the absorber formed on a transparent support, there are known ultraviolet absorbers, e.g., compounds (I-1) to (VIII-3) of JP-A No. 2001-147319.

There are no particular limitations on an electrical conductive layer included in the electrochromic device, and examples thereof include a metal thin film (gold, silver, copper, chromium, palladium, tungsten, and alloys thereof, etc.), an oxide semiconductor film (tin oxide, silver oxide, zinc oxide, vanadium oxide, ITO (indium oxide doped with tin oxide), antimony-doped tin oxide (ATO), FTO (fluorine-doped tin oxide), AZO (aluminum-doped zinc oxide)), a conductive nitride thin film (titanium nitride, zirconium nitride or hafnium nitride), a conductive boride thin film ($LaB_6$), a spinel type compound ($MgInO_4$ or $CaGaO_4$), a conducting polymer film (polypyrrole/$FeCl_3$), an ion conductive film (polyethylene oxide/$LiClO_4$), an inorganic/organic composite film (indium oxide fine powder/saturated polyester resin), and the like. Materials having low absorption of electromagnetic waves targeted by the optical device according to the present invention are preferably selected, and tin oxide, FTO and ITO are particularly preferable for light at $\lambda=400$ nm to 700 nm. Also, in order to further reduce the absorption of the target electromagnetic wave, the electrical conductive layer is preferably as thin as possible, so long as a desired conductivity can be achieved. Specifically, the thickness of the electrical conductive layer is preferably 1,000 nm or less, more preferably 200 nm or less, and particularly preferably 100 nm or less.

Examples of the porous material included in the electrochromic device include, but are not limited to, the following semiconductor materials (e.g., metal oxide, metal sulfide, and metal nitride), metals, and the like.

Examples of the metal oxide include, but are not limited to, titanium oxide, zinc oxide, silicon oxide, lead oxide, tungsten oxide, tin oxide, indium oxide, niobium oxide, cadmium oxide, bismuth oxide, aluminum oxide, gallium oxide (III), ferrous oxide, and complex compounds thereof, and their derivatives doped with fluorine, chlorine, antimony, phosphorus, arsenic, boron, aluminum, indium, gallium, silicon, germanium, titanium, zirconium, hafnium, tin, or the like. Alternatively, titanium oxide having its surface coated with ITO, antimony-doped tin oxide, FTO, or the like may be used.

Examples of the metal sulfide include, but are not limited to, zinc sulfide, cadmium sulfide, and complex compounds thereof, and their derivatives doped with aluminum, gallium, indium, or the like, and the like. Also, other materials having their surfaces coated with metal sulfide may be used.

Examples of the metal nitride layer include, but are not limited to, aluminum nitride, gallium nitride, indium nitride, and complex compounds thereof, and their derivatives doped with a small amount of heteroatom (e.g., tin or germanium). Also, other materials having their surfaces coated with metal nitride may be used. A material selected for use in a filter portion of the present invention preferably has low absorption of an electromagnetic wave targeted by the optical device. For light of $\lambda=400$ nm to 700 nm, titanium oxide, tin oxide, zinc oxide, zinc sulfide or gallium nitride is preferable, and tin oxide or zinc oxide is particularly preferable.

In the present invention, by causing the electrochromic material to be adsorbed onto a porous material as described above, it is possible to achieve a smooth flow of electrons into/out of the electrochromic device, thereby allowing the electrochromic device (optical density changing element) to change the optical density in a short period of time. In this case, the more amount of electrochromic material is adsorbed on the porous material, the higher the color density. In order to allow adsorption of a larger amount of electrochromic material, the porous material is rendered nanoporous to increase its surface area, and has a roughness coefficient of preferably 10 or more, more preferably 30 or more, and particularly preferably 100 or more.

An exemplary means for forming a porous material as described above is to bind ultrafine particles in the order of nanometers. In this case, by optimizing the sizes of particles to be used and the dispersion of the sizes, it is possible to minimize loss of transmitted light which is caused due to absorption or scattering of an electromagnetic wave by the semiconductor material. The sizes of particles to be used are preferably 100 nm or less, more preferably from 1 nm to 60 nm, and even more preferably from 2 nm to 40 nm. Regarding the particle sizes, the particles may be monodisperse or polydisperse depending on purposes, and monodisperse particles in different sizes are preferably mixed for use.

In the present invention, two or more layers of porous material to which an electrochromic material is adsorbed may be present. The layers of porous material to be used may be of the same composition or of different compositions. A porous material to which an electrochromic material is adsorbed and a porous material having no adsorbed electrochromic material may be used together.

Examples of the electrochromic material included in the electrochromic device include: organic dyes, such as a viologen dye, a phenothiazine dye, a styryl dye, a ferrocene dye, an anthraquinone dye, a pyrazoline dye, a fluoran dye, a phthalocyanine dye, and the like; conducting polymer compounds, such as polystyrene, polythiophene, polyaniline, polypyrrole, polybenzine, polyisothianaphtene, and the like; inorganic compounds, such as tungsten oxide, iridium oxide, nickel oxide, cobalt oxide, vanadium oxide, molybdenum oxide, titanium oxide, indium oxide, chromium oxide, manganese oxide, prussian blue, indium nitride, tin nitride, zirconium nitride chloride, and the like; and the like.

As used herein, when a specific portion of an organic compound is referred to as a "group", it means that the portion itself may not be substituted or may be substituted with one or more (up to a maximum allowable number) substituents. For example, an "alkyl group" indicates a substituted or unsubstituted alkyl group.

Assuming that such a substituent is represented by W, any substituents can be used as W without any particular limitations. Examples thereof include a halogen atom, alkyl groups (including a cycloalkyl group, a bicycloalkyl group and a tricycloalkyl group), alkenyl groups (including a cycloalkenyl group and a bicycloalkenyl group), an alkynyl group, an aryl group, a heterocyclic group (which may also be referred to as a "hetero ring group"), a cyano group, a hydroxyl group, a nitro group, a carboxyl group, an alkoxy group, an aryloxy group, a silyloxy group, a heterocyclic oxy group, an acyloxy group, a carbamoyloxy group, an alkoxycarbonyloxy group, an aryloxycarbonyloxy group, amino groups (including an alkylamino group, an arylamino group and a heterocyclic amino group), an ammonio group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group, a phosphono group, a silyl group, a hydrazino group, a ureido group, a boronate group (—B(OR)$_2$), a phosphato group (—OPO(OH)$_2$), a sulfato group (—OSO$_3$H), and other known substituents.

Also, two Ws may jointly form a ring (an aromatic or non-aromatic hydrocarbon ring or a heterocyclic ring, which may be further combined to form a polycyclic condensed ring, e.g., a benzene ring, a naphthalene ring, an anthracene ring, a phenanthrene ring, a fluorene ring, a triphenylene ring, a naphthacene ring, a biphenyl ring, a pyrrole ring, a furan ring, a thiophene ring, an imidazole ring, an oxazole ring, a thiazole ring, a pyridine ring, a pyrazine ring, a pyrimidine ring, a pyridazine ring, an indolizine ring, an indole ring, a benzofuran ring, a benzothiophene ring, an isobenzofuran ring, a quinolizine ring, a quinoline ring, a phthalazine ring, a naphthyridine ring, a quinoxaline ring, a quinoxazoline ring, an isoquinoline ring, a carbazole ring, a phenanthridine ring, an acridine ring, a phenanthroline ring, a thianthrene ring, a chromene ring, a xanthene ring, a phenoxathiin ring, a phenothiazine ring, and a phenazine ring).

Among the above substituents W, those having a hydrogen atom may be substituted with a group as described above after the hydrogen atom is removed therefrom. Examples of such substituents include —CONHSO$_2$— groups (a sulfonylcarbamoyl group and a carbonylsulfamoyl group), a —CONHCO— group (a carbonylcarbamoyl group), and a —SO$_2$NHSO$_2$— group (a sulfonylsulfamoyl group). More specifically, an alkylcarbonylaminosulfonyl group (e.g., acetylaminosulfonyl), an arylcarbonylaminosulfonyl group (e.g., a benzoylaminosulfonyl group), an alkylsulfonylaminocarbonyl group (e.g., methylsulfonylaminocarbonyl), and an arylsulfonylaminocarbonyl group (e.g., p-methylphenylsulfonylaminocarbonyl) are included.

The viologen dye is a compound as typified by the structures represented by general formulas (1), (2), and (3).

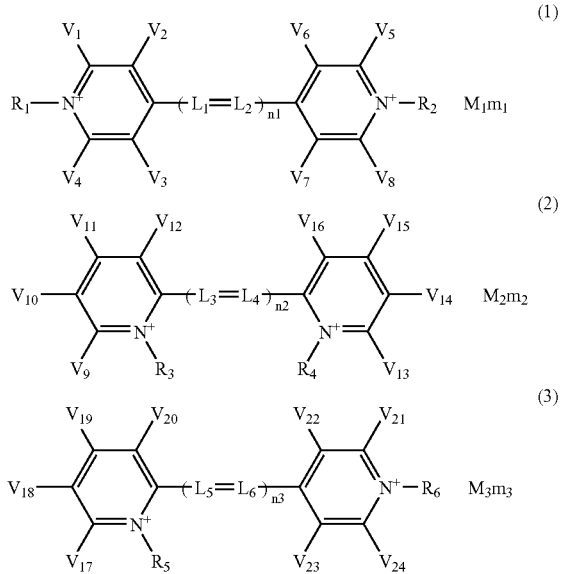

In general formulas (1), (2) and (3), $V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, $V_{15}$, $V_{16}$, $V_{17}$, $V_{18}$, $V_{19}$, $V_{20}$, $V_{21}$, $V_{22}$, $V_{23}$, and $V_{24}$ individually represent a hydrogen atom or a monovalent substituent.

$R_1$, $R_2$, $R_3$, $R_4$, $R_5$, and $R_6$ individually represent a hydrogen atom, an alkyl group, an aryl group, or a heterocyclic group.

$L_1$, $L_2$, $L_3$, $L_4$, $L_5$, and $L_6$ individually represent a methine group or a nitrogen atom.

$n_1$, $n_2$, and $n_3$ individually represent 0, 1, or 2.

$M_1$, $M_2$, and $M_3$ individually represent an electric charge for balancing a counter ion, and $m_1$, $m_2$, and $m_3$ individually represent a number of 0 or more necessary for neutralizing a molecular electric charge.

$V_1$, $V_2$, $V_3$, $V_4$, $V_5$, $V_6$, $V_7$, $V_8$, $V_9$, $V_{10}$, $V_{11}$, $V_{12}$, $V_{13}$, $V_{14}$, $V_{15}$, $V_{16}$, $V_{17}$, $V_{18}$, $V_{19}$, $V_{20}$, $V_{21}$, $V_{22}$, $V_{23}$, and $V_{24}$ individually represent a hydrogen atom or a monovalent substituent, and Vs may be bonded to each other or may form a ring. Also, the above may be bonded to other elements $R_1$ to $R_6$ and $L_1$ to $L_6$. The above-described W is an example of the monovalent substituent.

$R_1$, $R_2$, $R_3$, $R_4$, $R_5$, and $R_6$ individually represent a hydrogen atom, an alkyl group, an aryl group, or a heterocyclic group. An alkyl group, an aryl group, and a heterocyclic group are preferable, more preferably an alkyl group and an aryl group, and particularly preferably an alkyl group.

Specifically, examples of an alkyl group, an aryl group, and a heterocyclic group which are represented by $R_1$ to $R_6$, include unsubstituted alkyl groups having preferably one to eighteen carbon atoms, more preferably one to seven carbon atoms, and particularly preferably one to four carbon atoms (e.g., methyl, ethyl, propyl, isopropyl, butyl, isobutyl, hexyl, octyl, dodecyl and octadecyl), and substituted alkyl groups having preferably one to eighteen carbon atoms, more preferably one to seven carbon atoms, and particularly preferably one to four carbon atoms (e.g., substituted alkyl groups having the above-described W as a substituent, particularly preferably alkyl groups having an acid group). The acid group will be here described. The acid group refers to a group having a dissociable proton. Specifically, examples thereof include groups from which a proton is dissociated depending on their pka and environmental pH values, such as a sulfo group, a carboxyl group, a sulfato group, —CONHSO$_2$— groups (a sulfonylcarbamoyl group and a carbonylsulfamoyl group), a —CONHCO— group (a carbonylcarbamoyl group), a —SO$_2$NHSO$_2$— group (a sulfonylsulfamoyl group), a sulfonamide group, a sulfamoyl group, a phosphato group (—OP(=O) (OH)$_2$), a phosphono group (—P(=O)(OH)$_2$), a boronate group, a phenolic hydroxyl group, and the like. A proton-dissociable acid group, 90% of which or more undergoes dissociation at a pH of 5 to 11, is preferable, more preferably, a sulfo group, a carboxyl group, a —CONHSO$_2$— group, a —CONHCO— group, a —SO$_2$NHSO$_2$— group, a phosphato group, and a phosphono group, even more preferably a carboxyl group, a phosphato group, and a phosphono group, still even more preferably a phosphato group and a phosphono group, and most preferably a phosphono group.

Specifically, preferable substituted alkyl groups are aralkyl groups (e.g., benzyl, 2-phenylethyl, 2-(4-biphenyl) ethyl, 2-sulfobenzyl, 4-sulfobenzyl, 4-sulfophenethyl, 4-phosphobenzyl, and 4-carboxybenzyl), unsaturated hydrocarbon groups (e.g., an aryl group and a vinyl group; the substituted alkyl groups include alkenyl groups, and alkynyl groups), hydroxyalkyl groups (e.g., 2-hydroxyethyl and 3-hydroxypropyl), carboxyalkyl groups (e.g., carboxymethyl, 2-carboxyethyl, 3-carboxypropyl, and 4-carboxybutyl), phosphatoalkyl groups (e.g., phosphatomethyl, 2-phosphatoethyl, 3-phosphatopropyl, and 4-phosphatobutyl), phosphonoalkyl groups (e.g., phosphonomethyl, 2-phosphonoethyl, 3-phosphonopropyl, and 4-phosphonobutyl), alkoxyalkyl groups (e.g., 2-methoxyethyl and 2-(2-methoxyethoxy) ethyl), aryloxyalkyl groups (e.g., 2-phenoxyethyl, 2-(4-biphenyloxy)ethyl, 2-(1-naphthoxy)ethyl, 2-(4-sulfophenoxy) ethyl, and 2-(2-phosphophenoxy)ethyl), alkoxycarbonylalkyl groups (e.g., ethoxycarbonylmethyl and 2-benzyloxycarbonylethyl), aryloxycarbonylalkyl groups (e.g., 3-phenoxycarbonylpropyl and 3-sulfophenoxycarbonylpropyl), an acyloxyalkyl group (e.g., 2-acetyloxyethyl), an acylalkyl group (e.g., 2-acetylethyl), a carbamoylalkyl group (e.g., 2-morpholinocarbonylethyl), a sulfamoylalkyl group (e.g., N,N-dimethylsulfamoylmethyl), sulfoalkyl groups (e.g., 2-sulfoethyl, 3-sulfopropyl, 3-sulfobutyl, 4-sulfobutyl, 2-[3-sulfopropoxy]ethyl, 2-hydroxy-3-sulfopropyl, 3-sulfopropoxyethoxyethyl, 3-phenyl-3-sulfopropyl, 4-phenyl-4-sulfobutyl, and 3-(2-pyridyl)-3-sulfopropyl), a sulfoalkenyl group, sulfatoalkyl groups (e.g., a 2-sulfatoethyl group, 3-sulfatopropyl, and 4-sulfatobutyl), heterocyclic ring-substituted alkyl groups (e.g., 2-(pyrrolidine-2-one-1-yl)ethyl, 2-(2-pyridyl)ethyl, tetrahydrofurfuryl, and 3-pyridiniopropyl), an alkylsulfonylcarbamoylalkyl group (e.g., a methanesulfonylcarbamoylmethyl group), an acylcarbamoylalkyl group (e.g., an acetylcarbamoylmethyl group), an acylsulfamoylalkyl group (e.g., an acetylsulfamoylmethyl group), an alkylsulfonylsulfamoylalkyl group (e.g., a methanesulfonylsulfamoylmethyl group), ammonioalkyl groups (e.g., 3-(trimethylammonio)propyl and 3-ammoniopropyl), aminoalkyl groups (e.g., 3-aminopropyl, 3-(dimethylamino)propyl, and 4-(methylamino)butyl), and a guanidinoalkyl group (e.g., 4-guanidinobutyl).

Examples of the aryl group include substituted or unsubstituted aryl groups having preferably six to twenty carbon atoms, more preferably six to ten carbon atoms, and particularly preferably six to eight carbon atoms (examples of the substituted aryl groups are aryl groups substituted with W described above as an exemplary substituent, preferably aryl groups having an acid group, more preferably aryl groups substituted with a carboxyl group, a phosphato group or a phosphono group, particularly preferably aryl groups substituted with a phosphate group or a phosphono group, and most preferably aryl groups substituted with a phosphono group; specifically, phenyl, 1-naphthyl, p-methoxyphenyl, p-methylphenyl, p-chlorophenyl, biphenyl, 4-sulfophenyl, 4-sulfonaphthyl, 4-carboxyphenyl, 4-phosphatophenyl, 4-phosphonophenyl, and the like are included). Examples of the heterocyclic group include substituted or unsubstituted heterocyclic groups having preferably one to twenty carbon atoms, more preferably three to ten carbon atoms, and particularly preferably four to eight carbon atoms (examples of the substituted heterocyclic groups are substituted heterocyclic groups substituted with W described above as an exemplary substituent, preferably heterocyclic groups having an acid group, more preferably heterocyclic groups substituted with a carboxyl group, a phosphato group or a phosphono group, particularly preferably heterocyclic groups substituted with a phosphate group or a phosphono group, and most preferably heterocyclic groups substituted with a phosphono group; specifically, 2-furyl, 2-thienyl, 2-pyridyl, 3-pyrazolyl, 3-isoxazolyl, 3-isothiazolyl, 2-imidazolyl, 2-oxazolyl, 2-thiazolyl, 2-pyridazyl, 2-pyrimidyl, 3-pyrazyl, 2-(1,3,5-triazolyl), 3-(1,2,4-triazolyl), 5-tetrazolyl, 5-methyl-2-thienyl, 4-methoxy-2-pyridyl, 4-sulfo-2-pyridyl, 4-carboxy-2-pyridyl, 4-phosphato-2-pyridyl, 4-phosphono-2-pyridyl, and the like are included).

Also, the above may be bonded to other Rs, $V_1$ to $V_{24}$, and $L_1$ to $L_6$.

$L_1$, $L_2$, $L_3$, $L_4$, $L_5$, and $L_6$ individually represent a methine group or a nitrogen atom, preferably a methine group. Methine groups represented by $L_1$ to $L_6$ may have a substituent, and the above-mentioned W is an example of the substituent. Examples of the substituent include substituted or unsubstituted alkyl groups having one to fifteen carbon atoms, preferably one to ten carbon atoms, and particularly preferably one to five carbon atoms (e.g., methyl, ethyl, 2-carboxyethyl, 2-phosphatoethyl and 2-phosphonoethyl), substituted or unsubstituted aryl groups having six to twenty carbon atoms, preferably six to fifteen carbon atoms, and more preferably six to ten carbon atoms (e.g., phenyl, o-carboxyphenyl, o-phosphatophenyl and o-phosphonophenyl), substituted or unsubstituted heterocyclic groups having three to twenty carbon atoms, preferably four to fifteen carbon atoms, and more preferably six to ten carbon atoms (e.g., a N,N-dimethylbarbiturate group), halogen atoms (e.g., chlorine, bromine, iodine and fluorine), alkoxy groups having one to fifteen carbon atoms, preferably one to ten carbon atoms, and more preferably one to five carbon atoms (e.g., methoxy and ethoxy), amino groups having zero to fifteen carbon atoms, preferably two to ten carbon atoms, and more preferably four to ten carbon atoms (e.g., methylamino, N,N-dimethylamino, N-methyl-N-phenylamino and N-methylpiperazino), alkylthio groups having one to fifteen carbon atoms, preferably one to ten carbon atoms, and more preferably one to five carbon atoms (e.g., methylthio and ethylthio), arylthio groups having six to twenty carbon atoms, preferably six to twelve carbon atoms, and more preferably six to ten carbon atoms (e.g., phenylthio and p-methylphenylthio), and the like. Also, the above may be bonded to other methine groups to form a ring, or may be bonded to $V_1$ to $V_{24}$ and $R_1$ to $R_6$.

$n_1$, $n_2$, and $n_3$ individually represent 0, 1, or 2, preferably 0 or 1, and more preferably 0. When $n_1$ to $n_3$ are equal to or more than 2, methine groups or nitrogen atoms are repeated but may not be identical.

$M_1$, $M_2$, and $M_3$ are included in a formula of a compound to indicate the presence of a cation or an anion necessary for neutralizing ionic charges in the compound. Typical examples of the cation include inorganic cations, such as a hydrogen ion ($H^+$), alkali metal ions (e.g., a sodium ion, a potassium ion, and a lithium ion) and an alkaline earth metal ion (e.g., a calcium ion), and organic ions, such as ammonium ions (e.g., an ammonium ion, a tetraalkylammonium ion, a triethylammonium ion, a pyridinium ion, an ethylpyridinium ion, and a 1,8-diazabicyclo[5.4.0]-7-undecenium ion). The anion may be either inorganic or organic, and examples thereof include halogen anions (e.g., a fluorine ion, a chlorine ion, and an iodine ion), substituted arylsulfonate ions (e.g., a p-toluenesulfonate ion and a p-chlorobenzenesulfonate ion), aryldisulfonate ions (e.g., a 1,3-benzenesulfonate ion, a 1,5-naphthalenedisulfonate ion, and a 2,6-naphthalenedisulfonate ion), an alkylsulfate ion (e.g., a methylsulfate ion), a sulfate ion, a thiocyanate ion, a perchlorate ion, a tetrafluoroborate ion, a picrate ion, an acetate ion, and a trifluoromethanesulfonate ion. Further, an ionic polymer, or another dye having a charge opposite to that of the above dye, may be used. Also, $CO_2^-$, $SO_3^-$, and $P(\!=\!O)(\!-\!O^-)_2$ may be indicated as $CO_2H$, $SO_3H$, and $P(\!=\!O)(\!-\!OH)_2$, respectively, when they have a hydrogen ion as a counter ion.

$m_1$, $m_2$, and $m_3$ represent a number of 0 or more necessary for balancing electric charge, and the number is preferably 0 to 4, more preferably 0 to 2. When forming a salt within a molecule, the number is 0.

Specific examples of the compound that is a viologen dye are illustrated below, but they are not restrictive.

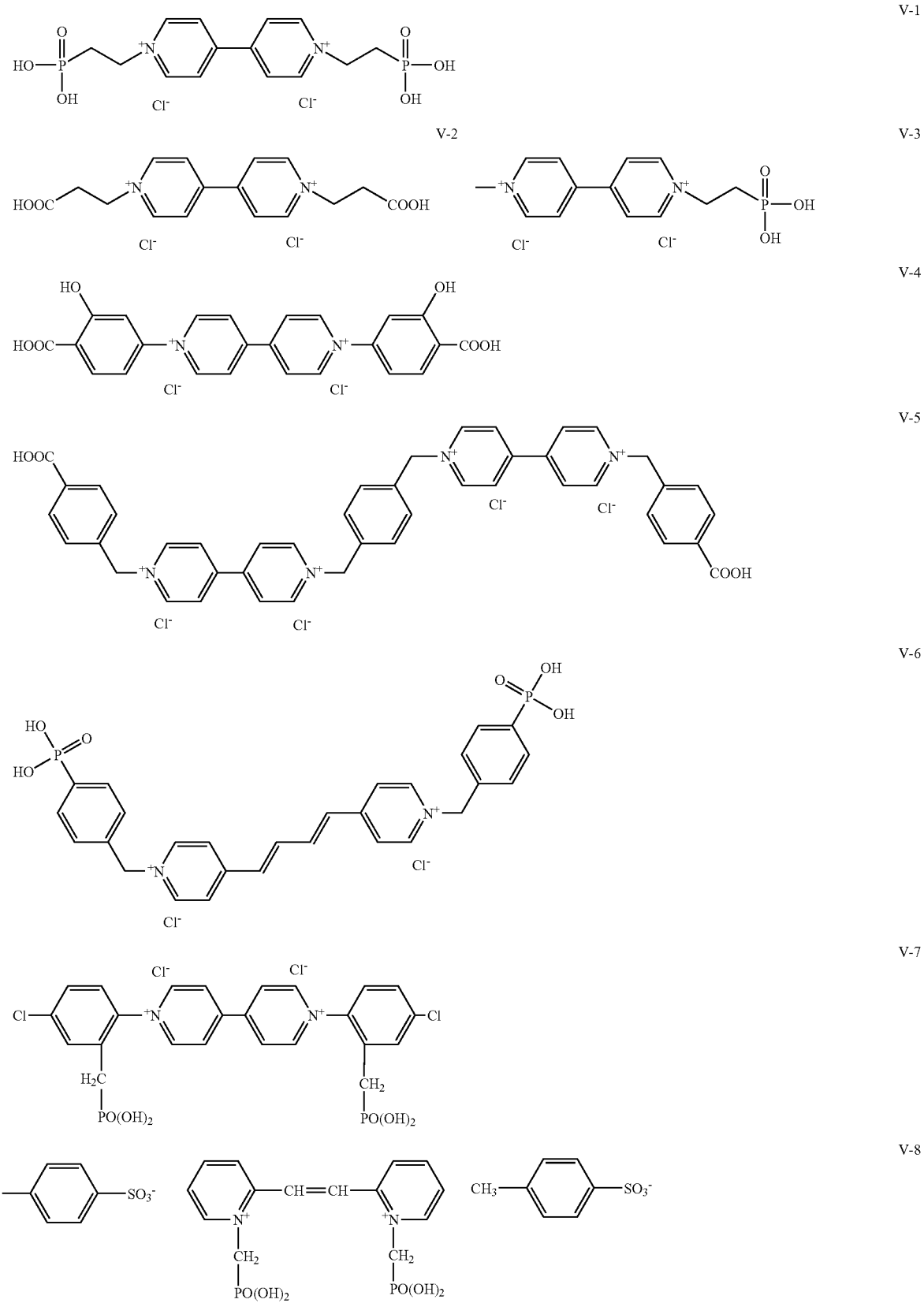

-continued
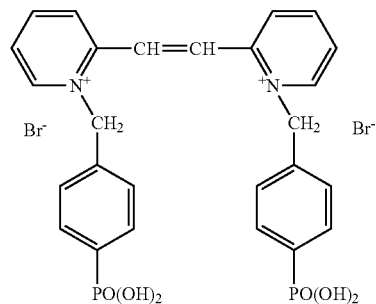
V-9
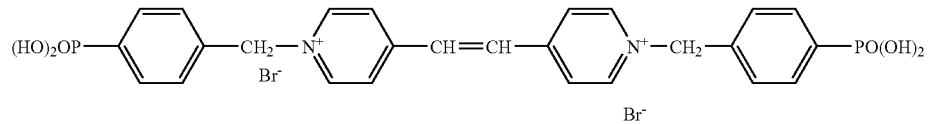
V-10
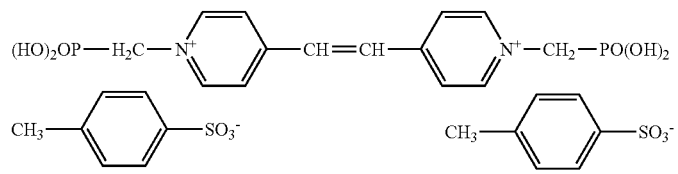
V-11
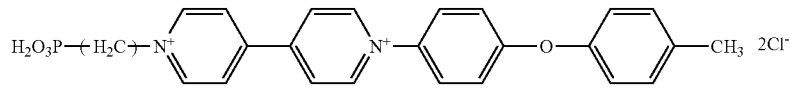
V-12
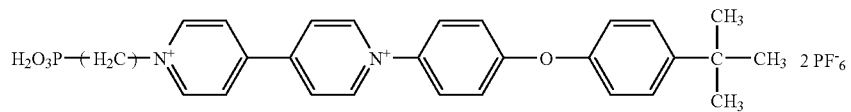
V-13
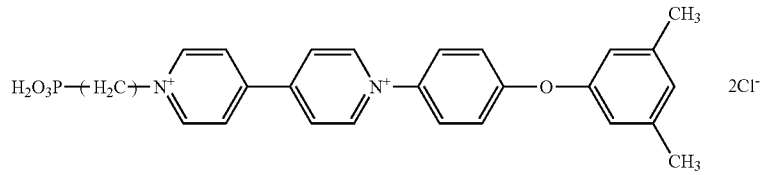
V-14
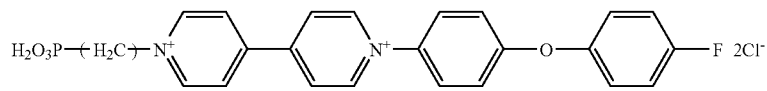
V-15
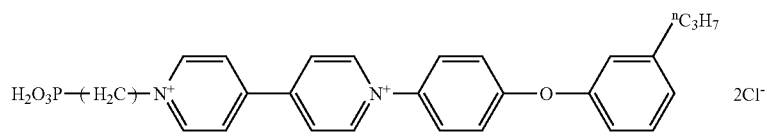
V-16
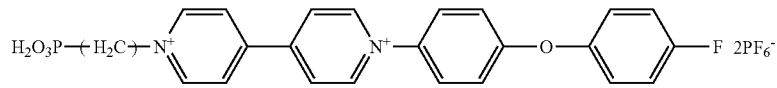
V-17
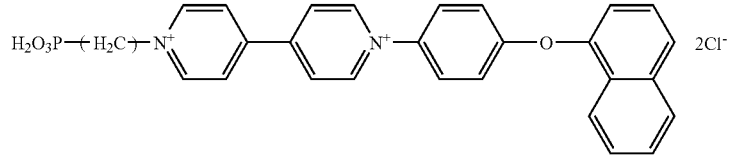
V-18
Also, specific examples of a preferable dye compound are compounds (1) to (33) in claim 4 of International Publication WO04/067673 pamphlet. The above-described viologen dye is preferably used as an electrochromic material.

The phenothiazine dye is a compound typified by the structure represented by the following general formula (6).

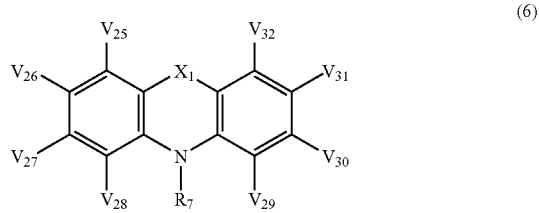

(6)

In general formula (6), $V_{25}$, $V_{26}$, $V_{27}$, $V_{28}$, $V_{29}$, $V_{30}$, $V_{31}$, and $V_{32}$ individually represent a hydrogen atom or a monovalent substituent, and Vs may be bonded to each other or may form a ring. Also, they may be bonded to another element $R_7$.

The above-described W is an example of the monovalent substituent.

$R_7$ is a hydrogen atom, an alkyl group, an aryl group, or a heterocyclic group, preferably an alkyl group, an aryl group, and a heterocyclic group, more preferably an alkyl group and an aryl group, and particularly preferably an alkyl group. Specific examples of an alkyl group, an aryl group and a heterocyclic group which are represented by $R_7$, include unsubstituted alkyl groups having preferably one to eighteen carbon atoms, more preferably one to seven carbon atoms, and particularly preferably one to four carbon atoms (e.g., methyl, ethyl, propyl, isopropyl, butyl, isobutyl, hexyl, octyl, dodecyl and octadecyl), and substituted alkyl groups having preferably one to eighteen carbon atoms, more preferably one to seven carbon atoms, and particularly preferably one to four carbon atoms (examples of the substituted alkyl groups are substituted alkyl groups having the above-described W as a substituent, particularly preferably alkyl groups having an acid group). The acid group has the same meaning as described concerning the "alkyl groups having an acid group", such as $R_1$, and specific and preferable examples thereof are the same as described above.

Specifically, preferable examples of the alkyl group, the aryl group, and the heterocyclic group include aralkyl groups (e.g., benzyl, 2-phenylethyl, 2-(4-biphenyl)ethyl, 2-sulfobenzyl, 4-sulfobenzyl, 4-sulfophenethyl, 4-phosphobenzyl, and 4-carboxybenzyl), unsaturated hydrocarbon groups (e.g., an aryl group and a vinyl group; it is here assumed that the substituted alkyl groups include alkenyl groups, and alkynyl groups), hydroxyalkyl groups (e.g., 2-hydroxyethyl, and 3-hydroxypropyl), carboxyalkyl groups (e.g., carboxymethyl, 2-carboxyethyl, 3-carboxypropyl, and 4-carboxybutyl), phosphatoalkyl groups (e.g., phosphatomethyl, 2-phosphatoethyl, 3-phosphatopropyl, and 4-phosphatobutyl), phosphonoalkyl groups (e.g., phosphonomethyl, 2-phosphonoethyl, 3-phosphonopropyl, and 4-phosphonobutyl), alkoxyalkyl groups (e.g., 2-methoxyethyl, and 2-(2-methoxyethoxy)ethyl), aryloxyalkyl groups (e.g., 2-phenoxyethyl, 2-(4-biphenyloxy)ethyl, 2-(1-naphthoxy)ethyl, 2-(4-sulfophenoxy)ethyl and 2-(2-phosphophenoxy)ethyl), alkoxycarbonylalkyl groups (e.g., ethoxycarbonylmethyl, and 2-benzyloxycarbonylethyl), aryloxycarbonylalkyl groups (e.g., 3-phenoxycarbonylpropyl and 3-sulfophenoxycarbonylpropyl), an acyloxyalkyl group (e.g., 2-acetyloxyethyl), an acylalkyl group (e.g., 2-acetylethyl), a carbamoylalkyl group (e.g., 2-morpholinocarbonylethyl), a sulfamoylalkyl group (e.g., N,N-dimethylsulfamoylmethyl), sulfoalkyl groups (e.g., 2-sulfoethyl, 3-sulfopropyl, 3-sulfobutyl, 4-sulfobutyl, 2-[3-sulfopropoxy]ethyl, 2-hydroxy-3-sulfopropyl, 3-sulfopropoxyethoxyethyl, 3-phenyl-3-sulfopropyl, 4-phenyl-4-sulfobutyl, and 3-(2-pyridyl)-3-sulfopropyl), a sulfoalkenyl group, sulfatoalkyl groups (e.g., a 2-sulfatoethyl group, 3-sulfatopropyl and 4-sulfatobutyl), heterocyclic ring-substituted alkyl groups (e.g., 2-(pyrrolidine-2-one-1-yl)ethyl, 2-(2-pyridyl)ethyl, tetrahydrofurfuryl, and 3-pyridiniopropyl), an alkylsulfonylcarbamoylalkyl group (e.g., a methanesulfonylcarbamoylmethyl group), an acylcarbamoylalkyl group (e.g., an acetylcarbamoylmethyl group), an acylsulfamoylalkyl group (e.g., an acetylsulfamoylmethyl group), an alkylsulfonylsulfamoylalkyl group (e.g., a methanesulfonylsulfamoylmethyl group), ammonioalkyl groups (e.g., 3-(trimethylammonio)propyl and 3-ammoniopropyl), aminoalkyl groups (e.g., 3-aminopropyl, 3-(dimethylamino)propyl, and 4-(methylamino)butyl), a guanidinoalkyl group (e.g., 4-guanidinobutyl), substituted or unsubstituted aryl groups having preferably six to twenty carbon atoms, more preferably six to ten carbon atoms, and particularly preferably six to eight carbon atoms (examples of the substituted aryl groups are aryl groups substituted with W described above as an exemplary substituent, preferably aryl groups having an acid group, more preferably aryl groups substituted with a carboxyl group, a phosphato group or a phosphono group, particularly preferably aryl groups substituted with a phosphato group or a phosphono group, and most preferably aryl groups substituted with a phosphono group; specifically, phenyl, 1-naphthyl, p-methoxyphenyl, p-methylphenyl, p-chlorophenyl, biphenyl, 4-sulfophenyl, 4-sulfonaphthyl, 4-carboxyphenyl, 4-phosphatophenyl, and 4-phosphonophenyl), and substituted or unsubstituted heterocyclic groups having preferably one to twenty carbon atoms, more preferably three to ten carbon atoms and particularly preferably four to eight carbon atoms (examples of the substituted heterocyclic groups are substituted heterocyclic groups substituted with W described above as an exemplary substituent, preferably heterocyclic groups having an acid group, more preferably heterocyclic groups substituted with a carboxyl group, a phosphato group or a phosphono group, particularly preferably heterocyclic groups substituted with a phosphato group or a phosphono group, and most preferably heterocyclic groups substituted with a phosphono group; specifically, 2-furyl, 2-thienyl, 2-pyridyl, 3-pyrazolyl, 3-isoxazolyl, 3-isothiazolyl, 2-imidazolyl, 2-oxazolyl, 2-thiazolyl, 2-pyridazyl, 2-pyrimidyl, 3-pyrazyl, 2-(1,3,5-triazolyl), 3-(1,2,4-triazolyl), 5-tetrazolyl, 5-methyl-2-thienyl, 4-methoxy-2-pyridyl, 4-sulfo-2-pyridyl, 4-carboxy-2-pyridyl, 4-phosphato-2-pyridyl, and 4-phosphono-2-pyridyl).

Also, the above may be bonded to $V_{25}$ to $V_{32}$.

$X_1$ represents a sulfur atom, an oxygen atom, a nitrogen atom (N—$R_a$), a carbon atom ($CV_aV_b$), or a selenium atom, preferably a sulfur atom. Note that $R_a$ represents a hydrogen atom, an alkyl group, an aryl group, or a heterocyclic group, examples of which are preferably the same as described above concerning $R_1$ to $R_7$. $V_a$ and $V_b$ represent a hydrogen atom or a monovalent substituent, examples of which are preferably the same as described above concerning $V_1$ to $V_{32}$ and $R_1$ to $R_7$.

Specific examples of the compound that is a phenothiazine dye are illustrated below, but they are not restrictive.

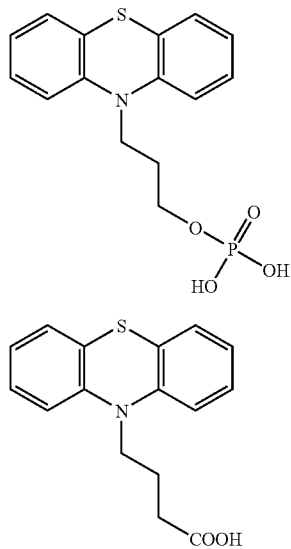

P-1

P-2

The styryl dye is a compound having a basic skeleton as represented by the following formula (7).

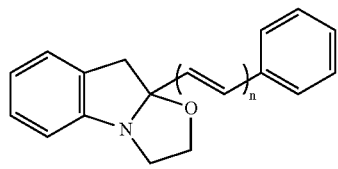

(7)

In the formula, n is 1 to 5. The compound may have any substituent at any position in the formula, and preferably has, in particular, an adsorption substituent, such as a carboxyl group, a sulfonate group, a phosphonate group, or the like. Specific examples thereof include, but are not limited to, compounds as illustrated below.

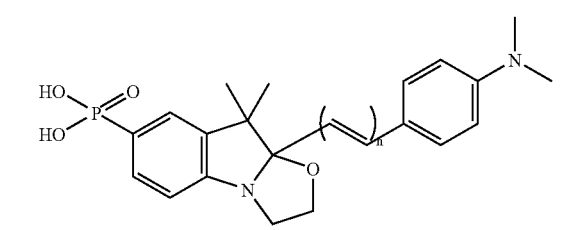

S-1

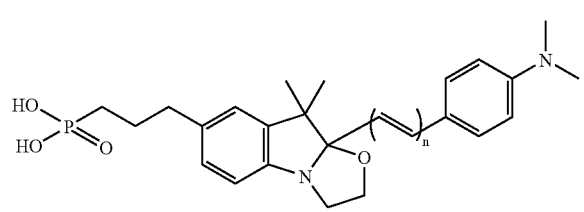

S-2

S-3

Regarding the organic compounds among the above electrochromic materials, their absorption wavelengths can be controlled by changing a substituent thereof. Also, two or more types of electrochromic materials for changing optical density are preferably used for allowing the electrochromic device (optical density changing element) to change optical densities at different wavelengths.

In the case of applying an optical device according to the present invention to a dimmer device of, for example, an image-taking unit (preferably, a camera unit), the device preferably has an absorption property similar to that of neutral gray, which uniformly absorbs incident light, and the electrochromic device (optical density changing element) absorbs visible light, preferably visible light at a plurality of different wavelengths, more preferably blue light, green light, and red light, and preferably satisfies the average optical density as described above concerning the solving means (13). The solving means (13) are capable of donating and accepting electrons, and can be realized by a single material or a combination of a plurality of materials which change the optical spectrum in the wavelength range from 400 nm to 700 nm as a result of donating and accepting electrons. The material that is used singly is preferably a viologen dye, and examples of a preferable combination of two or more materials include a viologen dye with a phenothiazine dye, a viologen dye with a ferrocene dye, a phthalocyanine dye with prussian blue, a viologen dye with nickel oxide, a viologen dye with iridium oxide, tungsten oxide with a phenothiazine dye, a viologen dye with a phenothiazine dye and a styryl dye, two types of viologen dyes (two dyes having different substituents) with a phenothiazine dye, two types of viologen dyes (two dyes having different substituents) with a styryl dye, and two types of viologen dyes (two dyes having different substituents) with nickel oxide.

The electric charge transport material is a material having an electric charge transporting function based on ion conductivity and/or electron conductivity. Examples of the electric charge transport material include the following four materials: [1] a liquid electrolyte, i.e., an electrolytic solution (see, for example, "Kagakusosetsu Shingatadenchi No Zairyokagaku (Review Of Chemistry, Material Chemistry Of New Batteries)", The Chemical Society Of Japan, No. 49, P. 109 (2001), FIG. 1); [2] a polymer electrolyte (see, for example, "Kagakusosetsu Shingatadenchi No Zairyokagaku (Review Of Chemistry, Material Chemistry Of New Batteries)", The Chemical Society Of Japan, No. 49, P. 118 (2001), FIG. 8); [3] a solid electrolyte (see, for example, "Kagakusosetsu Shingatadenchi No Zairyokagaku (Review Of Chemistry, Material Chemistry Of New Batteries)", The Chemical Society Of Japan, No. 49, P. 123 (2001)); and [4] a room-temperature molten salt (see, for example, "Kagakusosetsu Shingatadenchi No Zairyokagaku (Review Of Chemistry, Material Chemistry Of New Batteries)", The Chemical Society Of Japan, No. 49, P. 129 (2001)). The responsiveness of the electrochromic device is dependent on the ion conductivity of the electric charge transport material, and therefore, when importance is placed on the responsiveness, the liquid electrolyte of [1], which has a high ion conductivity, is preferable. However, there are practical problems to take measures against loss of liquid due to leakage or evaporation.

Also, in order to promote an electrochemical reaction of the electrochromic material, an auxiliary compound may be present in the electrochromic device (optical density changing element). The auxiliary compound may or may not be oxidized or reduced. The optical density at λ=400 nm to 700 nm of the auxiliary compound may or may not be changed by oxidation-reduction. The auxiliary compound may be present on metal oxide as is in the electrochromic material, or dissolved in an electrolytic solution, or may form a layer by itself on the electrical conductive layer. The auxiliary compound is preferably a material on an anode of the electrochromic device, that is capable of donating and accepting electrons and does not substantially change the optical absorption spectrum in the wavelength range from 400 nm to 700 nm as a result of donating and accepting electrons.

In the case where the electric charge transport material of the electrochromic device (optical density changing element) is an electrolytic solution, the electrolytic solution may contain a solvent and a supporting electrolyte, and an auxiliary compound may be contained therein. The supporting electrolyte by itself causes no electrochemical reaction through donating/accepting electric charge, and plays the role of enhancing the conductivity. The solvent preferably has a polarity, and is specifically one member or a mixture of two or more members selected from the group consisting of, for example, water, alcohol (e.g., methanol, ethanol, etc.), carboxylic acid (e.g., acetic acid, etc.), acetonitrile, propionitrile, glutaronitrile, adiponitrile, methoxyacetonitrile, dimethylacetamide, methylpyrrolidinone, formamide, N,N-dimethylformamide, dimethylsulfoxide, dimethoxyethane, propylenecarbonate, ethylenecarbonate, γ-butyrolactone, tetrahydrofuran, dioxolane, sulfolan, trimethylphosphate, pyridine, hexamethylene acid triamide, and polyethyleneglycol.

The supporting electrolyte is a salt which functions as a charge carrier (ion) in a solvent and is composed of a combination of an anion and a cation so that it is easily ionized. Examples of the cation include metal ions typified by $Li^+$, $Na^+$, $K^+$, $Rb^+$, and $Cs^+$ and quaternary ammonium ions typified by a tetrabutyl ammonium ion. Examples of the anion include halogen ions typified by $Cl^-$, $Br^-$, $I^-$, and $F^-$, a sulfate ion, a nitrate ion, a perchlorate ion, a tosylate ion, a tetrafluoroborate ion, a hexafluorophosphate ion, and the like. Other examples of the electrolyte are molten salt systems typified by LiCl/KCl, solid electrolyte systems typified by an ionic conductor and a superionic conductor, and solid polymer electrolyte systems typified by a membrane ionic conductive substance, such as an ion exchange membrane.

In the optical device according to the present invention, materials for the electrochromic device (optical density changing element) are suitably combined, i.e., the types of the support, the electrical conductive layer, and the electrochromic material are optimized, or the type and particle size of the porous material are optimized, so that the optical density at λ=400 nm in the decolored state is preferably suppressed to 0.2 or less (preferably, 0.125 or less). Similarly, the average optical density at λ=400 nm to 500 nm in the decolored state, the average optical density at λ=500 nm to 600 nm in the decolored state, and the average optical density at λ=600 nm to 700 nm in the decolored state are all preferably kept at 0.1 or less. On the other hand, the average optical density at λ=400 nm to 700 mm in the colored state in response to irradiation by an electromagnetic wave is preferably 0.5 or more, more preferably 0.8 or more, and particularly preferably 0.95 or more.

In the optical device according to the present invention, the electrochromic device (optical density changing element) and the electromotive force-generating element may be directly connected together or may be connected together via a circuit having an amplifying or protecting function. Also, the circuit configuration preferably includes a resistance connected in parallel with the electrochromic device (optical density changing element) so as to promote cancellation of applied voltage when light is blocked.

The optical device according to the present invention is applicable to, for example, a vehicle window material, a display device, a camera-related optical device, and the like. One exemplary effective application of the optical device according to the present invention is a camera-related optical device. The device is effective for any image-taking units (preferably, a camera unit), including large/medium-sized cameras, a single-lens reflex camera, a compact camera, a single-use camera, a digital camera, a broadcast camera, a motion picture film camera, a motion picture digital camera, an image-taking unit (preferably, camera unit) for a mobile phone, an 8-mm movie camera, and the like. A particularly effective application is a simple image-taking system as typified by a single-use camera, which requires no complicated control mechanism. Another exemplary effective application is a digital camera having a CCD or a CMOS as an image-taking device, because the image-taking device can be compensated for its narrow dynamic range.

In the case of incorporating the optical device according to the present invention into an image-taking unit, the electrochromic device is preferably provided on the optical axis of an image-taking lens.

Also, the hue of the electrochromic device in the colored state is preferably similar to that of an image recording medium included in the image-taking unit. The image recording medium as used herein refers to a preloaded color negative film when the image-taking unit is a single-use camera, a CCD or a CMOS when the unit is an electronic still camera, and a camera CCD when the unit is a mobile phone with a camera. It is preferable that the overlap in spectral sensitivity between the hue of the electrochromic device in the colored state and the hue of the image recording medium included in the image-taking unit be as large as possible. Specifically, "neutral gray" as used herein means not only that the optical absorption spectrum of the electrochromic device in the colored state is uniform throughout the wavelength range from 400 to 700 nm (the term "uniform" indicates that the difference between the average optical density in the wavelength range from 400 to 700 nm and the optical density at each wavelength is small, e.g., the difference in optical density is 0.1), but also that the overlap between the hue of the device in the colored state and the hue of the recording medium of the image-taking unit is so large that the colored state becomes substantially "neutral gray" to the image-taking unit.

EXAMPLES

Hereinafter, examples of the present invention will be described, but the present invention is not limited thereto.

Example 1

Polyethyleneglycol (molecular weight: 20,000) was added to an aqueous dispersion of tin oxide having an average diameter of 5 nm, and uniformly stirred to prepare a coating solution. As a substrate to be coated, an ITO conductive glass (thickness: 0.7 mm) provided with an anti-reflection film was used. The coating solution was uniformly applied on the ITO film of the transparent conductive glass. After the application, the glass was heated up to 450° C. over a time period of 100 minutes, and baking was carried out at 450° C. for 30 minutes to remove polymer. The application and the baking were repeated until the total amount of the applied tin oxide reached 7 $g/m^2$, to obtain a tin oxide nanoporous electrode having a uniform thickness. The electrode prepared in the above-described manner had a surface roughness coefficient of about 400.

A 0.04 mol/L aqueous solution was prepared for each of compounds Nos. 1 to 4 described below. The tin oxide nanoporous electrode as prepared above was immersed in the solutions, and was shaken at 40° C. for 3 hours to obtain tin oxide nanoporous substrates Nos. 1 to 4 to which the compounds Nos. 1 to 4 were adsorbed, respectively.

An electrolyte solution was prepared by dissolving 0.2 mol/L lithium perchlorate in a γ-butyrolactone solvent. A nanoporous tin oxide glass with a conductive glass supporting the compound was partially immersed in the solution before carrying out MS measurement. Table 1 shows a negative change in a flat band potential, electric charge, and an energy level in each example compared to a blank (comparative example).

TABLE 1

| Sample No. | Compound | Negative change in flat band potential | Charge | Energy level |
|---|---|---|---|---|
| Comparative example | None | 0 | | |
| Example 101 | No. 1 | 0.55 | −0.73 | −10.83 |
| Example 102 | No. 2 | 0.50 | −0.73 | −10.85 |
| Example 103 | No. 3 | 0.15 | −0.67 | −10.74 |
| Example 104 | No. 4 | 0.50 | −0.74 | −9.36 |

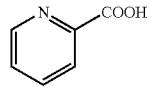

No. 1

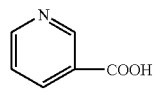

No. 2

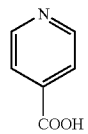

No. 3

No. 4

Therefore, it is obvious that the flat band potential is negatively changed by causing a compound with a lone electron pair to be adsorbed onto the surface of a semiconductor.

Particularly, the compound No. 1 achieves a significant effect. A reason for this is considered to be that an adsorption group (carboxylic acid) is present on the same side as an N atom.

The compound No. 3 achieves a sufficient effect, but less significant than that achieved by the compound No. 1. A reason for this is considered to be that an adsorption group (carboxylic acid) is present on the opposite side to an N atom.

Even a compound, such as the compound No. 4, which has no adsorption group other than an N atom, achieves a significant effect, even though the effect thereof is less than that achieved by the compound No. 1.

Example 2

Methods for preparing a sample 202 (present invention) of the electrochromic device according to the present invention and a sample 201 (comparative example) will be described.

(1) Preparation of Sample 201 (Comparative Example)

The sample 201 (comparative example) was prepared in the following procedure: (i) application of nanoparticulate tin oxide for cathode, (ii) application of nanoparticulate tin oxide for anode, (iii) adsorption of electrochromic dyes, and (iv) assembly of an electrochromic device, in this order.

(i) Application of Nanoparticulate Tin Oxide for Cathode

Polyethyleneglycol (molecular weight: 20,000) was added to an aqueous dispersion of tin oxide having a diameter of about 40 nm, and uniformly stirred to prepare a coating solution. As a substrate to be coated, an ITO conductive glass (thickness: 0.7 mm) having an anti-reflection film on the rear side was used. The coating solution was uniformly applied onto the ITO film of the transparent conductive glass substrate so that the weight of tin oxide was 9 g/m$^2$. After the application, the coated glass substrate was baked at 450° C. for 30 minutes to obtain a tin oxide nanoporous electrode. The electrode prepared in the above-described manner had a surface roughness coefficient of about 400.

(ii) Application of Nanoparticulate Tin Oxide for Anode

Polyethyleneglycol (molecular weight: 20,000) was added to an aqueous dispersion of tin oxide having an average diameter of 5 nm, and uniformly stirred to prepare a coating solution. As a substrate to be coated, an ITO conductive glass (thickness; 0.7 mm) provided with an anti-reflection film was used. The coating solution was uniformly applied onto the ITO film of the transparent conductive glass. After the application, the glass was heated up to 450° C. over a time period of 100 minutes, and baking was carried out at 450° C. for 30 minutes to remove polymer. The application and the baking were repeated until the total amount of the applied tin oxide reached 7 g/m$^2$, to obtain a tin oxide nanoporous electrode having a uniform thickness. The electrode prepared in the above-described manner had a surface roughness coefficient of about 400.

(iii) Adsorption of Electrochromic Dyes

As the electrochromic dyes, chromic dyes V-1 and P-1 were used. The chromic dye V-1 has a property of being colored through oxidation-reduction, and the chromic dye P-1 has a property of being colored through oxidation. V-1 and P-1 were dissolved in water and chloroform, respectively, so that their densities were 0.15 mol/l. The tin oxide nanoporous electrode for cathode prepared in (i) and the tin oxide nanoporous electrode for anode prepared in (ii) were immersed in the V-1 solution and the P-1 solution, respectively, to cause the dyes to be adsorbed onto the nanoporous substrates. After the adsorption of the dyes, the glasses were washed in their respective solvents, followed by vacuum drying. In this manner, nanoporous materials to which the dyes were adsorbed were obtained.

(iv) Assembly of an Electrochromic Device

The tin oxide nanoporous substrate to which V-1 was adsorbed and the tin oxide nanoporous substrate to which P-1 was adsorbed, both of which were obtained in (iii), were assembled so that the nanoporous material portions were opposed to each other (FIG. 1) The gap in the assembled electrochromic device was filled with an electrolytic solution which is a γ-butyrolactone solution having a 0.2 mol/L lithium perchlorate dissolved therein, followed by sealing. Note that the electrolytic solution used was previously dehydrated and degassed. The thus-prepared electrochromic device sample 201 (comparative example) was colored by connecting the tin oxide nanoporous electrode to which V-1 was adsorbed and the tin oxide nanoporous electrode to which P-1 was adsorbed, to negative and positive terminals, respectively, and was decolored by short-circuiting the both electrodes.

(2) Preparation of Sample 202 (Present Invention)

The sample 202 (present invention) was prepared in a manner similar to that of the sample 201 (comparative example). Note that the preparation of the sample 202 was carried out in the same manner as the preparation of the sample 201 (comparative example), except that the step (iii) of causing electrochromic dyes to be adsorbed was different from the step (iii) of adsorbing electrochromic dyes and the compound No. 1.

(iii) Adsorption of Electrochromic Dyes and Compound No.

As the electrochromic dyes, chromic dyes V-1 and P-1 were used. The chromic dye V-1 has a property of being colored through oxidation-reduction, and the chromic dye P-1 has a property of being colored through oxidation. The tin oxide nanoporous electrode for cathode prepared in (i) was immersed in a mixed solution of V-1 and the compound No. 1 (density of each element: 0.15 mol/l) to cause V-1 and the compound No. 1 to be adsorbed onto the nanoporous electrode. The tin oxide nanoporous electrode for anode prepared in (ii) was immersed in a chloroform solution of P-1 (density: 0.15 mol/l) to cause P-1 to be adsorbed onto the nanoporous electrode. In this manner, nanoporous electrodes to which the dyes and the compound were adsorbed were obtained.

(iv) Assembly of an Electrochromic Device

The tin oxide nanoporous substrate to which V-1 and the compound No. 1 were adsorbed and the tin oxide nanoporous substrate to which P-1 was adsorbed, both of which were obtained in (iii), were assembled so that the nanoporous material portions were opposed to each other (FIG. 1). The gap in the assembled electrochromic device was filled with an electrolytic solution which is a γ-butyrolactone solution having a 0.2 mol/L lithium perchlorate dissolved therein, followed by sealing. Note that the electrolytic solution used was previously dehydrated and degassed. The thus-prepared electrochromic device sample 202 (present invention) was colored by connecting the tin oxide nanoporous electrode to which V-1 and the compound No. 1 were adsorbed and the tin oxide nanoporous electrode to which P-1 was adsorbed, to negative and positive terminals, respectively, and was decolored by short-circuiting the both electrodes.

Table 2 shows the optical densities of samples 201 (comparative example) and 202 (present invention) in the decolored state and the optical densities Δ in the colored state (=Optical density in the colored state−color density in the decolored state). Note that, when the electrochromic device is used as a dimmer filter, the optical densities in the decolored state are preferably as low as possible, and the optical densities Δ in the colored state are preferably as high as possible.

TABLE 2

|  | Optical density in decolored state | Optical density Δ in colored state |
| --- | --- | --- |
| Sample 201 (comparative example) | 0.05 | 0.5 |
| Sample 202 (present invention) | 0.05 | 0.92 |

As can be seen from Table 2, the sample 202 (present invention) exhibits superior performance that its optical density Δ in the colored state is higher than that of the sample 201 (comparative example).

Example 3

An example in which the electrochromic device sample 202 of the present invention is incorporated into a lens-combined film, will be described.

Figure 2:
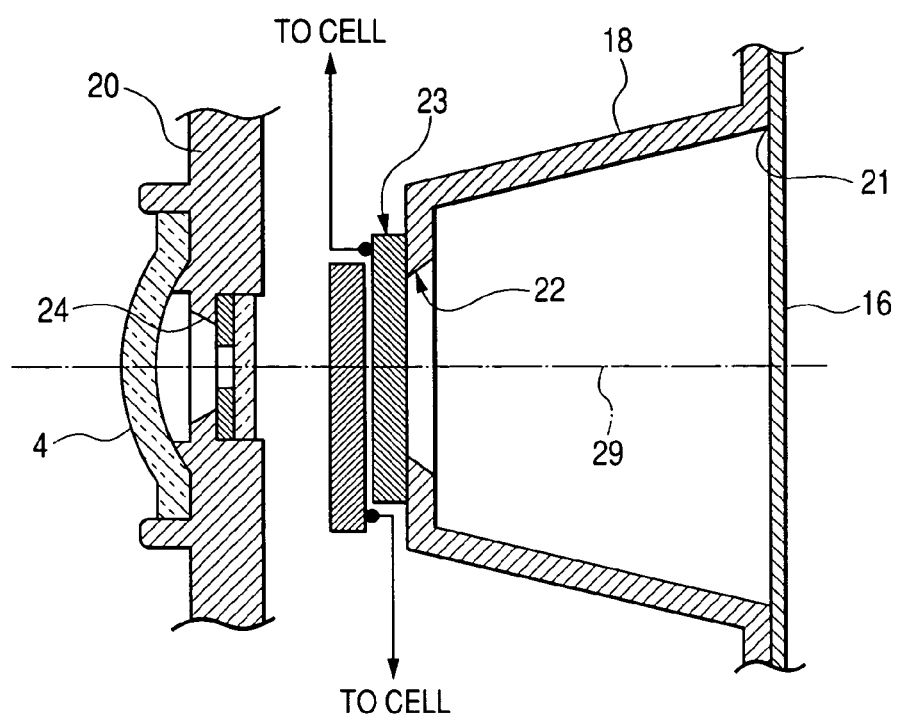
FIG. 2 is a schematic cross-sectional view of a principal portion of a lens-combined film including an optical device according to the present invention.
Figure 3:
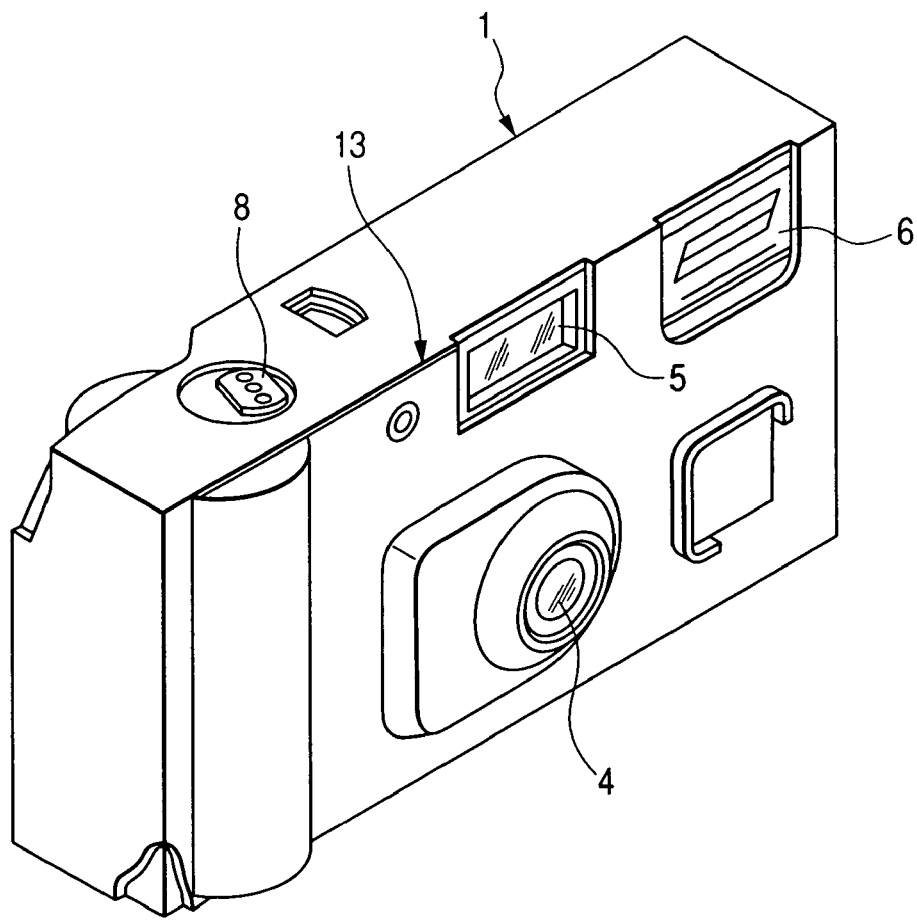
FIG. 3 is an external view of an exemplary lens-combined film including an optical device according to the present invention.

As illustrated in FIGS. 2 and 3, a lens-combined film in this example includes (1) a dimmer filter 23 (an electrochromic device) and (2) a phototransistor 13 (an electromagnetic wave sensor). The phototransistor 13 is provided external to the unit to generate electromotive force in accordance with the illuminance of external light, so that the dimmer filter 23 can be colored by the electromotive force to control the intensity of light reaching a color negative film 16.

(1) Electrochromic Device Sample 202

The electrochromic device sample 202 prepared in Example 2 was used.

(2) Circuitry of the Electrochromic Device

Figure 4:
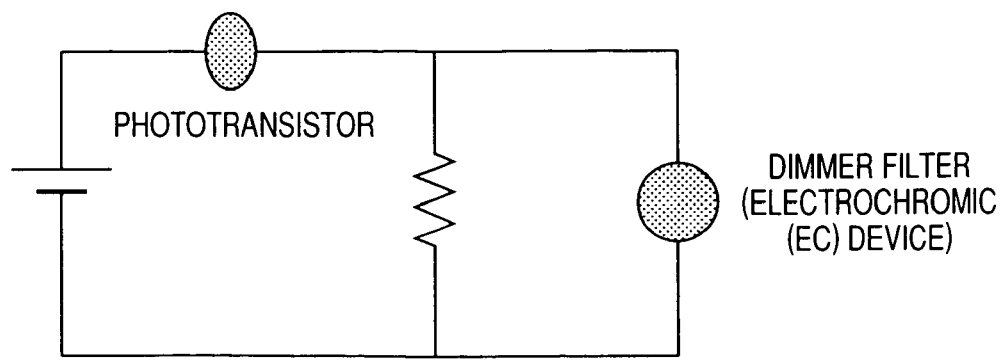
FIG. 4 is a schematic diagram illustrating an exemplary circuit of a control device including an optical device according to the present invention.

As the electromagnetic wave sensor, a phototransistor (PT380, manufactured by Sharp Corp.), and as the electromotive force-generating element, a dry cell (AA size: 1.5 V) for a strobe of the single-use camera was used. Also, a resistance (1 kΩ) was connected in parallel with the electrochromic device 202 (see the schematic diagram of an exemplary circuit in FIG. 4).

The dimmer filter in (1) and the phototransistor in (2) were used to prepare a lens-combined film configured as illustrated in Table 5 below. The film used has an ISO number of 1600, the aperture value is F8, and the shutter speed is 1/85". In the case where the image-taking system configured according to these conditions is used, a negative having an optimum density can be obtained when a picture is taken in the condition where EV=8.4.

TABLE 3

| Sample No. | Phototransistor | Electrochromic device |
| --- | --- | --- |
| 501 (comparative example) | Not included | Not included |
| 502 (present invention) | Included | Sample 202 |

Figure 5:
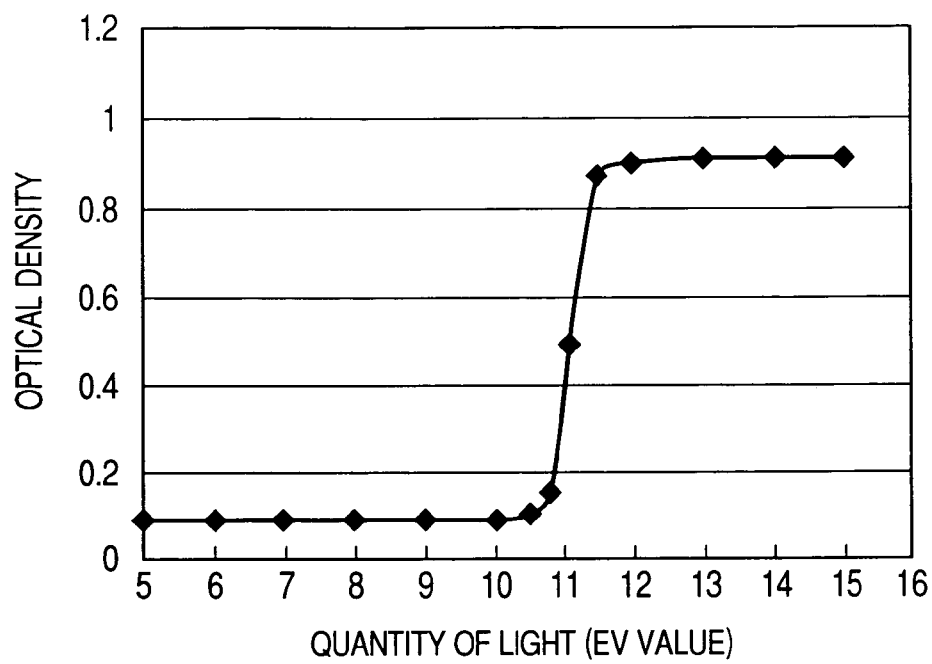
FIG. 5 is a graph illustrating the responsiveness of an optical device used in Example 3 according to the present invention with respect to electromotive force.

FIG. 5 illustrates the optical density responsiveness of the sample 502 with respect to the intensity of sunlight. The optical density illustrated here is the average value at λ=400 nm to 700 nm. Table 4 shows correspondence between optical densities and "aperture values" generally used in image-taking systems. Note that incrementing the aperture value by +1 reduces the intensity of transmitted light by half, and corresponds to an increase in optical density by 0.3. As illustrated in FIG. 5, the aperture value of the optical device was at +0.2 when light was blocked, and the aperture value was incremented up to +2.9 upon irradiation with light at EV=11.5 and up to +3.2 upon irradiation with light at EV=12.0 or more. The response time for the change was 10 seconds. Note that EV refers to a value indicating brightness, which is calculated by the following mathematical expression (2) based on luminance L represented by lux, which is a practical unit of illumination.

$$EV=\log_2(L/2.4) \qquad \text{Mathematical expression (2)}$$

With regard to the above-described aperture value, incrementing the aperture value of an optical device by +1 corresponds to reducing by 1 the EV value (i.e., brightness) of light received by the optical device.

The above units 501 (comparative example) and 502 (present invention) were used to take pictures at the place where the brightness is in the range of EV=6.4 (corresponding to dark indoor place) to 154 (corresponding to clear-sky conditions in midsummer), and Fuji Photo Film CN-16 development processing was carried out for 3 minutes and 15 seconds. Comparison in exposure level between the resultant negatives is illustrated in Table 4. Note that the exposure level is used for estimating appropriateness of density of processed negatives, and an optimum density of a negative is set at 0. As described above, in the case of the image-taking system used here, when a picture is taken in the condition where EV=8.4, an obtained negative has an optimum density, i.e., exposure level=0. By "an exposure level of +1", it is meant that the density is higher by an aperture value of 1 (=higher by an optical density of 0.3) than an appropriate gray density, and by "an exposure level of −1", it is meant that the density is lower by an aperture value of −1 (=lower by an optical density of 0.3) than an appropriate gray density.

TABLE 4

| | Conditions for picture taking | | | | | | | | | |
|---|---|---|---|---|---|---|---|---|---|---|
| Sample No. | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
| 501 (comparative example) | −2.0 | −1.0 | 0 | +1.0 | +2.0 | +3.0 | +4.0 | +5.0 | +6.0 | +7.0 |
| 502 (present invention) | −2.2 | −1.2 | −0.2 | +0.8 | +1.8 | +0.4 | +0.9 | +1.9 | +2.9 | +3.9 |

In the case of developing prints based on the resultant negatives, it is possible to correct a deviation in exposure level to some extent. Specifically, in the case where the exposure level of a negative is in the range from −1 to +4, it is possible to correct the negative when developing a print, thereby obtaining a "successfully-taken picture". If the exposure level is not in the above range, correction fails when developing a print, resulting in obtaining an "unsuccessful picture". Table 5 shows whether pictures obtained by developing prints from negatives captured under the above-described conditions are successful or not. Success is indicated by ○, whereas failure is indicated by X.

From Table 5, the following can be seen. Compared to the comparative example 501 having no dimmer system, the present invention 502 having a dimmer system has a slightly narrower image-taking allowable area under low illumination conditions (low EV value conditions), but a significantly wider image-taking allowable area under high illumination conditions (high EV value conditions). Therefore, it is possible to realize a camera system having a generally wider image-taking area.

Example 4

In this example, the ISO number of the negative film loaded in the single-use camera, which is 1600 in Example 3, is selected from 100, 400, 1600, and 3200. Table 6 shows the results obtained by taking pictures using negative films with the above ISO numbers. Note that the degrees of success in picture taking are indicated by ⊚○, Δ, and X in descending order of success.

TABLE 5

| | Conditions for picture taking | | | | | | | | | |
|---|---|---|---|---|---|---|---|---|---|---|
| Sample No. | EV = 6.4 | EV = 7.4 | EV = 8.4 | EV = 9.4 | EV = 10.4 | EV = 11.4 | EV = 12.4 | EV = 13.4 | EV = 14.4 | EV = 15.4 |
| 501 (comparative example) | x | ○ | ○ | ○ | ○ | ○ | ○ | x | x | x |
| 502 (present invention) | x | x | ○ | ○ | ○ | ○ | ○ | ○ | ○ | ○ |

TABLE 6

| Sample No. | ISO number | Presence or absence of dimmer filter | Place for picture taking | |
|---|---|---|---|---|
| | | | Dark indoor place | Bright outdoor place |
| 601 (comparative example) | 100 | Not included | x | ○ |
| 602 (comparative example) | 400 | Not included | Δ | ○ |
| 603 (comparative example) | 1600 | Not included | ○ | Δ |
| 604 (comparative example) | 3200 | Not included | ◎ | x |
| 605 (present invention) | 100 | Included | x | ○ |
| 606 (present invention) | 400 | Included | Δ | ○ |
| 607 (present invention) | 1600 | Included | ○ | ○ |
| 608 (present invention) | 3200 | Included | ◎ | ○ |

From Table 6, the following can be seen. Among the samples 605 to 608 having a dimmer system according to the present invention, the sample 608 makes it possible to realize a camera system having a particularly wide image-taking area. It will be understood that the dimmer filter according to the present invention most effectively functions when used in combination with a highly sensitive negative film.

Example 5

In this example, an electrochromic device according to the present invention was provided in a single-use camera disclosed in JP-A No. 2003-344914. In the present example, comparison experiment was conducted as in Example 3, and it was found that the electrochromic device according to the present invention achieved a superior dimmer effect.

Example 6

Figure 6:
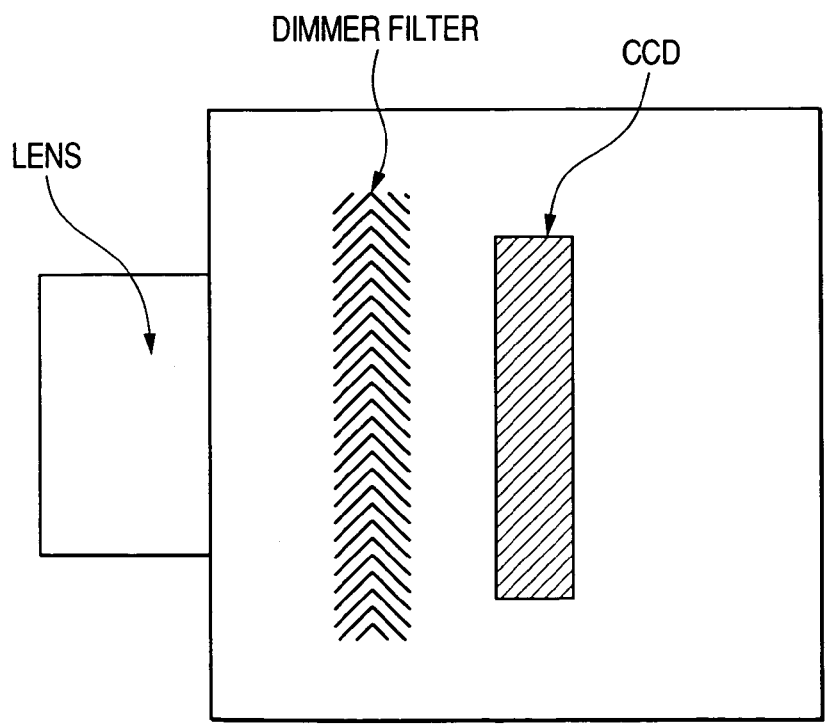
FIG. 6 is a schematic cross-sectional view of a principal portion of an electronic still camera including an optical device according to the present invention.
Figure 7:
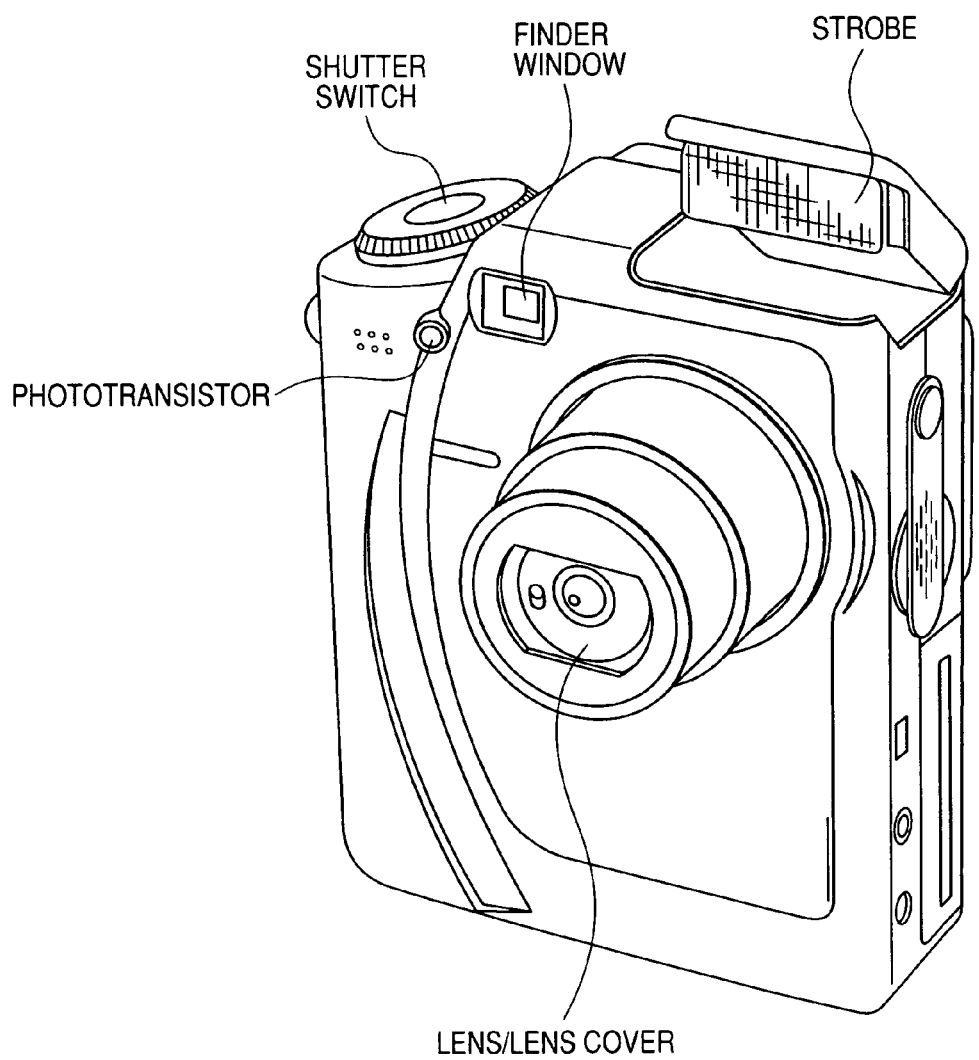
FIG. 7 is a schematic external view of an exemplary electron still camera including an optical device according to the present invention.

In this example, a dimmer filter was provided in an electronic still camera. As illustrated in FIG. 6, the electronic still camera according to the present invention includes, as a dimmer filter, the electrochromic device 501 which was prepared in Example 3 and was provided between a lens and a CCD. Further, as illustrated in FIG. 7, the same phototransistor as that of Example 3 was provided on an external part, and was connected to a power source, i.e., a cell in the electronic still camera, so as to control the dimmer filter. Comparison experiment was conducted as in the case of the lens-combined film of Example 3, and it was found that the electronic still camera according to the present invention having a narrow dynamic range achieved a more significant dimmer effect than that of the lens-combined film.

Example 7

In this example, an electrochromic device according to the present invention was provided in an electronic still camera disclosed in JP-A No. 2004-222160. In the present example, comparison experiment was conducted as in Example 6, and it was found that the electrochromic device according to the present invention achieved a superior dimmer effect.

Example 8

In this example, an electrochromic device according to the present invention was provided in an electronic still camera disclosed in JP-A No. 2004-236006. In the present example, comparison experiment was conducted as in Example 6, and it was found that the electrochromic device according to the present invention achieved a superior dimmer effect.

Example 9

In this example, an electrochromic device according to the present invention was provided in an electronic still camera disclosed in JP-A No. 2004-247842. In the present example, comparison experiment was conducted as in Example 6, and it was found that the electrochromic device according to the present invention achieved a superior dimmer effect.

Example 10

In this example, an electrochromic device according to the present invention was provided in an electronic still camera disclosed in JP-A No. 2004-245915. In the present example, comparison experiment was conducted as in Example 6, and it was found that the electrochromic device according to the present invention achieved a superior dimmer effect.

Example 11

In this example, a dimmer filter was provided in an image-taking unit for a mobile phone. The electrochromic device 401 prepared in Example 4 was provided as a dimmer filter on the lens of the image-taking unit for a mobile phone. Further, the same phototransistor as in Example 3 was provided on the exterior of the image-taking unit, and was connected to a power source, i.e., a cell in the mobile phone, so as to control the dimmer filter. Compared to an image-taking unit without such an optical device as provided by the present invention, the mobile phone including the image-taking unit according to the present invention is capable of picture taking in a wider range of exposure conditions Example 12

In this example, an electrochromic device according to the present invention was provided in a mobile phone with a camera including an image-taking lens disclosed in JP-A No. 2004-271991. In the present example, comparison experiment was conducted as in Example 6, and it was found that the electrochromic device according to the present invention achieved a superior dimmer effect.

The present invention makes it possible to control a flat band potential toward a lower potential, independently from a semiconductor material. By the flat band potential control means according to the present invention, it is possible to select a semiconductor material for a functional device using a semiconductor material from the viewpoint of ease of handling, production suitability, and the like. It is also possible to provide a functional device, particularly an electrochromic device, which achieves a further significant effect.

The entire disclosure of each and every foreign patent application from which the benefit of foreign priority has been claimed in the present application is incorporated herein by reference, as if fully set forth.

What is claimed is:

1. A semiconductor comprising
a compound (A) adsorbed on a surface of the semiconductor, the compound (A) having at least one lone electron pair and substantially not undergoing oxidation-reduction reactions,
wherein the presence of the compound (A) negatively changes a flat band potential of the semiconductor with reference to that when the compound is absent.

2. The semiconductor of claim 1,
wherein the compound (A) has at least one portion which can be adsorbed onto the surface of the semiconductor.

3. The semiconductor of claim 1,
wherein the compound (A) is a heterocyclic compound.

4. The semiconductor of claim 1,
wherein an atom having the lone electron pair is an N atom or an O atom.

5. The semiconductor of claim 1,
wherein the compound (A) is a five- or six-membered ring compound including an N atom or an O atom.

6. The semiconductor of claim 1,
wherein an atom having the lone electron pair has an electric charge of −0.40 or less.

7. The semiconductor of claim 1,
wherein an atom having the lone electron pair has an energy level of −11 eV or more.

8. The semiconductor of claim 1,
wherein the semiconductor is a nanoporous material.

9. A functional device comprising the semiconductor of claim 1.

10. A photoelectric transducer comprising the semiconductor of claim 1.

11. A photoelectrochemical cell, comprising the semiconductor of claim 1.

12. An electrochromic device comprising the semiconductor of claim 1.

13. The electrochromic device of claim 12, having an optical density of 0.2 or less at a wavelength of 400 nm in a decolored state.

14. The electrochromic device of claim 12,
wherein a mean value of an optical density at a wavelength of from 400 to 500 nm, a mean value of an optical density at a wavelength of from 500 to 600 nm, and a mean value of an optical density at a wavelength of from 600 to 700 nm in a decolored state, are all 0.1 or less.

15. An optical device comprising:
an electromotive force-generating element for generating electromotive force in response to electromagnetic waves; and
the electrochromic device of claim 12, driven by the electromotive force.

16. An image-taking unit comprising the optical device of claim 15.

17. The image-taking unit of claim 16, which is a single-use camera.

* * * * *